US010601779B1

(12) United States Patent
Matthews et al.

(10) Patent No.: US 10,601,779 B1
(45) Date of Patent: Mar. 24, 2020

(54) VIRTUAL PRIVATE NETWORK (VPN) SERVICE BACKED BY EVENTUALLY CONSISTENT REGIONAL DATABASE

(71) Applicant: Amazon Technologies, Inc., Seattle, WA (US)

(72) Inventors: Nicholas Channing Matthews, Seattle, WA (US); Bashuman Deb, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 653 days.

(21) Appl. No.: 15/188,512

(22) Filed: Jun. 21, 2016

(51) Int. Cl.
*H04L 29/06* (2006.01)
*H04L 12/46* (2006.01)
*H04L 29/08* (2006.01)

(52) U.S. Cl.
CPC ...... *H04L 63/0272* (2013.01); *H04L 12/4633* (2013.01); *H04L 12/4641* (2013.01); *H04L 63/0428* (2013.01); *H04L 67/141* (2013.01); *H04L 67/26* (2013.01)

(58) Field of Classification Search
CPC . H04L 63/0272; H04L 63/0428; H04L 67/26; H04L 12/4641; H04L 67/141; H04L 12/4633
See application file for complete search history.

(56) References Cited

U.S. PATENT DOCUMENTS

| | | | |
|---|---|---|---|
| 8,443,435 B1 * | 5/2013 | Schroeder | H04L 63/08 726/15 |
| 8,800,007 B1 * | 8/2014 | Rajagopalan | H04L 63/0272 380/27 |
| 9,430,256 B2 | 8/2016 | Raghu | |
| 9,729,517 B2 * | 8/2017 | Brandwine | H04L 63/0428 |
| 9,742,758 B1 * | 8/2017 | Sharifi Mehr | H04L 63/0823 |
| 9,781,081 B1 * | 10/2017 | Wasiq | H04L 63/0428 |
| 9,923,923 B1 * | 3/2018 | Sharifi Mehr | H04L 63/166 |
| 9,930,067 B1 * | 3/2018 | Johansson | H04L 63/166 |
| 9,935,769 B1 * | 4/2018 | Mehr | H04L 63/0272 |
| 10,003,607 B1 * | 6/2018 | Kolman | H04L 63/0272 |
| 10,033,703 B1 * | 7/2018 | Sharifi Mehr | G06F 21/6218 |
| 10,063,590 B1 * | 8/2018 | Sharifi Mehr | H04L 63/166 |
| 10,122,689 B2 * | 11/2018 | MacCarthaigh | H04L 63/0428 |
| 10,257,167 B1 | 4/2019 | Matthews et al. | |

(Continued)

OTHER PUBLICATIONS

Matsuhashi, Yohei, et al. "Transparent VPN failure recovery with virtualization." Future Generation Computer Systems 28.1 (2012): 78-84. (Year: 2012).*

(Continued)

*Primary Examiner* — Mahfuzur Rahman
(74) *Attorney, Agent, or Firm* — Patterson + Sheridan, LLP

(57) ABSTRACT

Embodiments presented herein disclose a VPN service which includes a cluster of VPN appliances that requires only an eventually consistent database to share VPN session data among cluster nodes. Doing so provides a VPN service that can scale both horizontally (i.e., the VPN service can support large numbers of VPN appliances) as well as geographically (i.e., nodes of the cluster do not need to be physically proximate to one another in order to satisfy latency requirements). Thus, the VPN service can provide regional endpoints to VPN clients that do not share common points of failure or administrative burdens.

20 Claims, 13 Drawing Sheets

(56) References Cited

U.S. PATENT DOCUMENTS

| | | | |
|---|---|---|---|
| 10,291,589 B1* | 5/2019 | Sharifi Mehr | H04L 67/32 |
| 2002/0093915 A1* | 7/2002 | Larson | H04L 63/0272 |
| | | | 370/235 |
| 2003/0088698 A1* | 5/2003 | Singh | H04L 12/4641 |
| | | | 709/239 |
| 2004/0218611 A1* | 11/2004 | Kim | H04L 12/4633 |
| | | | 370/401 |
| 2004/0225895 A1* | 11/2004 | Mukherjee | H04L 12/4633 |
| | | | 726/15 |
| 2005/0235352 A1* | 10/2005 | Staats | H04L 41/082 |
| | | | 726/14 |
| 2006/0090074 A1* | 4/2006 | Matoba | H04L 63/0272 |
| | | | 713/171 |
| 2007/0033646 A1* | 2/2007 | Tosey | H04L 67/14 |
| | | | 726/15 |
| 2007/0056020 A1* | 3/2007 | Ward | H04L 63/1408 |
| | | | 726/3 |
| 2007/0192842 A1 | 8/2007 | Beaulieu et al. | |
| 2009/0031415 A1* | 1/2009 | Aldridge | H04L 63/0272 |
| | | | 726/15 |
| 2009/0037763 A1* | 2/2009 | Adhya | H04L 12/4641 |
| | | | 714/4.12 |
| 2009/0037998 A1* | 2/2009 | Adhya | G06Q 20/027 |
| | | | 726/11 |
| 2009/0217358 A1* | 8/2009 | Kumar | H04L 63/0272 |
| | | | 726/5 |
| 2010/0077204 A1* | 3/2010 | Kawano | H04L 63/0428 |
| | | | 713/153 |
| 2010/0125897 A1* | 5/2010 | Jain | H04L 63/0272 |
| | | | 726/7 |
| 2011/0264905 A1 | 10/2011 | Ovsiannikov | |
| 2012/0254608 A1* | 10/2012 | Ho | H04L 45/38 |
| | | | 713/153 |
| 2015/0263867 A1* | 9/2015 | Chen | H04L 12/4641 |
| | | | 370/401 |
| 2015/0288750 A1 | 10/2015 | Nagargadde et al. | |
| 2016/0212012 A1* | 7/2016 | Young | H04L 41/14 |
| 2017/0075770 A1 | 3/2017 | Tsirkin | |
| 2017/0126626 A1 | 5/2017 | Datta et al. | |
| 2017/0126812 A1 | 5/2017 | Singhal | |
| 2017/0272255 A1* | 9/2017 | Larson | H04L 9/3263 |
| 2018/0248703 A1* | 8/2018 | Larson | H04L 9/3263 |

OTHER PUBLICATIONS

Palomares, Daniel, Daniel Migault, and Maryline Laurent. "Failure preventive mechanism for IPsec gateways." ICCIT'13: The Third International Conference on Communications and Information Technology. IEEE, 2013. (Year: 2013).*

* cited by examiner

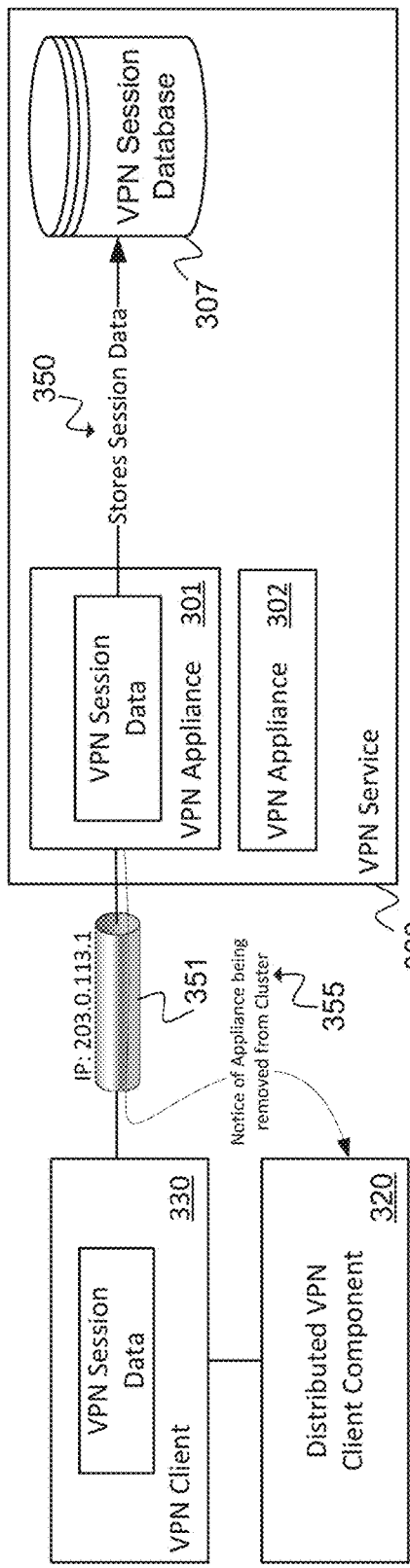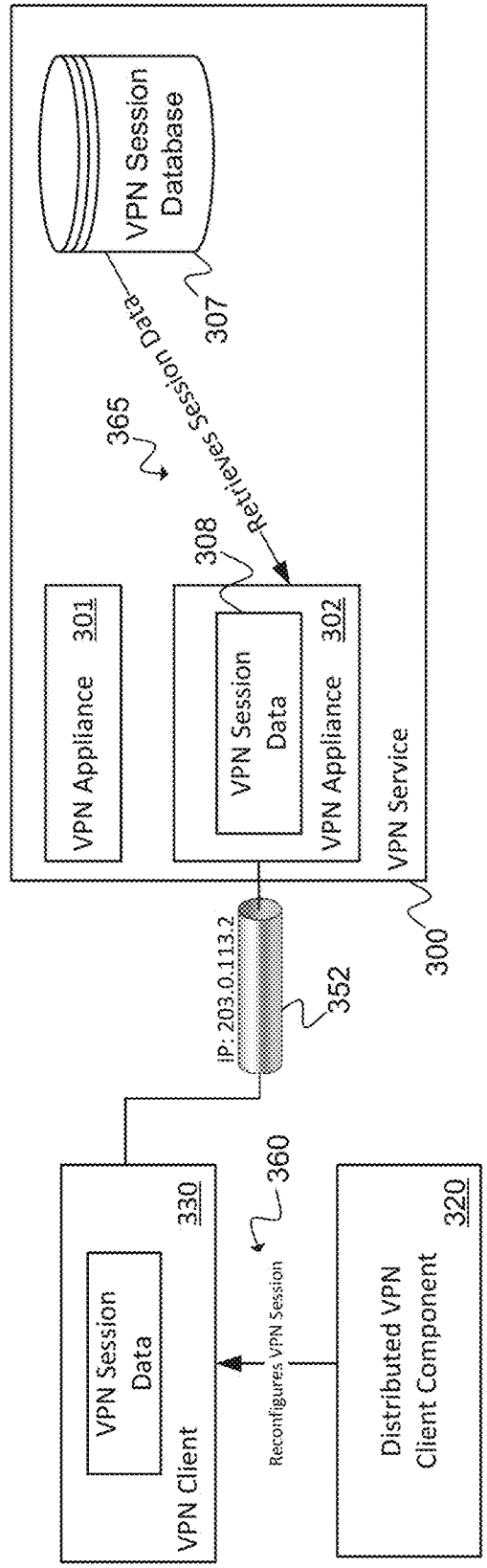
FIG. 3B
FIG. 3C

VIRTUAL PRIVATE NETWORK (VPN) SERVICE BACKED BY EVENTUALLY CONSISTENT REGIONAL DATABASE

This application relates to virtual private networks (VPN). More specifically, this application relates to an approach for providing a VPN service using a cluster of VPN appliance nodes supported by an eventually consistent regional database used to store VPN session data.

A virtual private network (VPN) generally refers to computer software and hardware used to establish an encrypted connection between a client and a private network (e.g., an enterprise LAN) over another, typically less secure network (e.g., the internet). That is, a VPN allows a client to establish a virtual private "tunnel" connecting the client and private network. Once connected, the client system may generally communicate with other hosts on the private network and interact with resources, e.g., enterprise applications and data, on the private network as though the client were a local host on the private network. A VPN tunnel can connect individual clients to a VPN endpoint (e.g., remote users connecting to an enterprise network using a laptop computer) or site-to-site (e.g., VPN appliances connecting one enterprise network segment to another).

Once a VPN session is established, each packet transmitted between a client and VPN endpoint is encrypted and encapsulated (wrapped) in a new packet with a new header. The encapsulating header provides routing information which allows the packet (with the encrypted payload) to traverse the intermediate network before reaching the tunnel endpoint. At the VPN endpoint, the payload is decrypted (e.g., by a VPN appliance) and forwarded towards a destination. A variety of networking protocols are used to provide VPN services including, e.g., IPsec, L2TP, PPTP, and SSL.

For both client and site-to-site VPNs, both ends of the VPN tunnel need to negotiate, share, and maintain certain state information during a VPN session—e.g., security associations, session identifiers, packet sequence numbers, etc. If the software or hardware on either end of a VPN tunnel goes down, the VPN tunnel needs to be reestablished as part of a new session.

The need for current session information regarding a given VPN session makes it difficult to create a distributed clustered VPN service. For example, while some VPN appliances may be deployed as a cluster, such appliances are typically highly latency bound, as each member of the cluster is expected to have access to session data in a strongly consistent manner. That is, each node in a VPN cluster is expected to have the same VPN session data at all times. Thus, VPN clusters are usually co-located with one another, resulting in common points of failure (e.g., due to power loss or networking issues) and limiting the size of a cluster.

BRIEF DESCRIPTION OF DRAWINGS

FIGS. 3B-3C illustrate a VPN session migrated from a first VPN appliance to second VPN appliance using VPN session data stored in an eventually consistent database, according to one embodiment.

DETAILED DESCRIPTION

Figure 1:
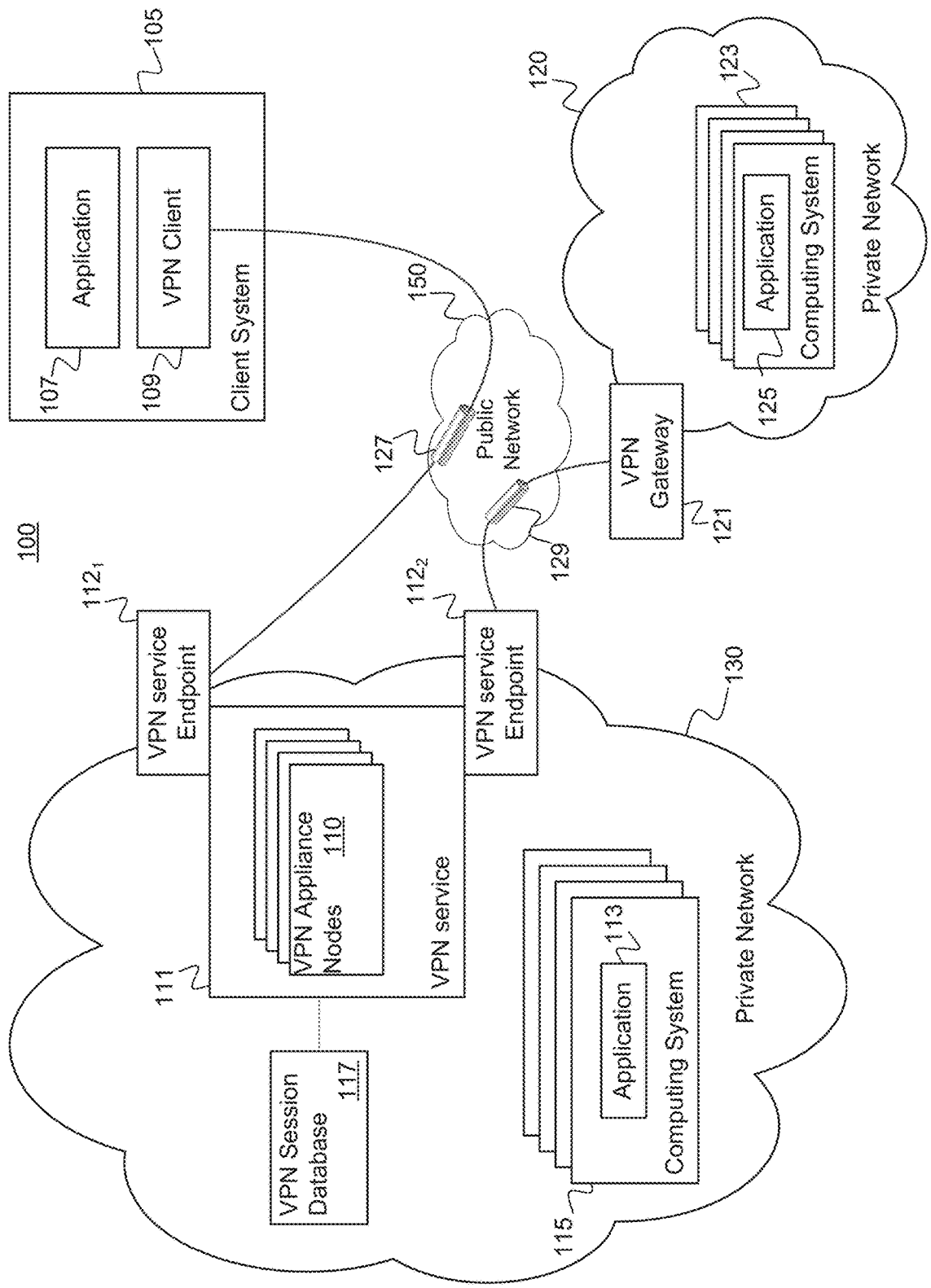
FIG. 1 illustrates an example computing environment hosting a VPN service backed by an eventually consistent database, according to one embodiment.

As noted, above, while some VPN appliances provide limited clustering capabilities, such clustering capabilities are typically very latency bound as each VPN appliance node participating in the cluster expects to have consistent VPN session data at all times. Embodiments presented herein disclose a VPN service which includes a cluster of VPN appliances that requires only an eventually consistent database to share VPN session data among cluster nodes. Doing so provides a VPN service that can scale both horizontally (i.e., the VPN service can support large numbers of VPN appliances) as well as geographically (i.e., nodes of the cluster do not need to be physically proximate to one another in order to satisfy latency requirements). Thus, the VPN service can provide regional endpoints to VPN clients that do not share common points of failure or administrative burdens.

When establishing a new VPN session (whether for a single VPN client session or for a site-to-site VPN session), the client and VPN appliance negotiate a variety of parameters used to establish and maintain that session. For example, VPN session data typically include keys, session requirements, supported (or required) cryptographic or hashing algorithms or parameters, network latency or bandwidth requirements, security associations, TCP ports, packet sequence numbers, and the like. Further, many VPN appliances provide other network services for traffic carried over a VPN connection, e.g., firewall services, NAT gateways, and other security functions (intrusion prevention and detection, antivirus, etc.). These services also create a variety of session information and state data. However, the data needed to maintain (or restore) a VPN session itself is relatively small and, other than packet sequence numbers, relatively stable once a VPN session has been established.

In one embodiment, each VPN appliance in a VPN cluster pushes VPN session data generated for VPN sessions on that appliance to a regional backend database. VPN appliances participating in a cluster may access the backend database to obtain session data for any VPN session on any VPN appliance (if available). The backend database stores key VPN session data using an eventual consistency model. That is, the backend database provides an eventually consistent database, where VPN session data is updated in a best-effort fashion with no guarantee that all VPN sessions for all nodes are always in the database (or current with the state on a corresponding VPN).

Currently, when a VPN appliance fails, each VPN session established on that appliance has to be re-authenticated and a new session negotiated and started. In contrast, embodiments presented herein provide a VPN service where VPN sessions on one VPN appliance may be restored on another VPN appliance. To do so, a VPN appliance retrieves the key VPN session data from the backend database and resumes the VPN session. Because the backend database does not enforce strict consistency requirements, embodiments disclosed herein can provide a global or regional VPN service that can handle node failures gracefully. While the VPN service does not guarantee all sessions on a failed VPN appliance can be restored, the VPN service can typically restore any VPN session that had been authenticated and established for a period exceeding a delay (typically seconds) needed for the eventually consistent database to be updated with the VPN session data. Thus, most users would have their VPN sessions restored with a few seconds of delay while the VPN service heals itself.

Using the eventually consistent database also allows a VPN service to provide clients with multiple endpoints to a private network, eliminating a common point of failure in conventional VPN clustering solutions. Further, this approach provides a flexible deployment model for a VPN service that can integrate a variety of web-based practices in the VPN service. For example, the VPN service may use a load balancer to distribute new VPN session requests to a pool of VPN appliance nodes.

The VPN service may also include components which monitor for failures in VPN appliance nodes and remove bad nodes from an available VPN node list—preventing any new VPN sessions from being directed to the failed appliance. In one embodiment, a VPN client may identify a new VPN appliance on which to resume a VPN session (e.g., using a DNS query or a dedicated VPN node service listing). In other cases, the VPN service may move VPN sessions from one VPN appliance to another—either following a failure in a VPN service or prior to a VPN appliance being taken out of service. In this latter case, the VPN service may manage client VPN sessions without requiring that clients connect to the service using a particular VPN client. To do so, the VPN service may move an IP address used by a VPN appliance being taken out of service to another VPN appliance.

Alternatively, the VPN client may be configured to access the VPN service to obtain a list of available VPN appliances. In such a case, the VPN client could determine which VPN clients to use to establish a VPN sessions, e.g., based on acceptable latencies or service availability. Further, the client could establish multiple VPN tunnels either for additional throughput or for redundancy. If notified that a given VPN appliance was being taken out of service (or determining that an active session had failed), the client could reestablish the session with another VPN appliance (which pulls session information from the backend database, if needed). Further, in some cases, multiple VPN appliances could cache session information for sessions on other VPN appliances in the cluster, optionally pulling new or updated VPN session information form the backend database on-demand based on unknown sessions incoming or proactively pulling session information when notified of a service failure of another VPN appliance. Such an approach would be effective for a limited number of sessions for a deployment that did not enable sequence numbers in the tunneling protocol.

Note, embodiments of the invention are described below using certain network protocols, including, e.g., IPsec, L2TP, PPTP, and SSL, used to establish VPN sessions and to provide examples of VPN session data pushed to an eventually consistent backend database. Of course, one of ordinary skill in the art will recognize that embodiments of the VPN service described herein may be adapted for use with a variety VPN applications and protocols.

FIG. 1 illustrates an example computing environment 100 hosting a VPN service 111 backed by an eventually consistent database 117, according to one embodiment. As shown, the computing environment 100 includes a client system 105, private network segments 120, 130, which communicate over a public network 150 (e.g., the internet). In this example, the private network 130 network hosts a VPN service 111, accessed over VPN service endpoints $112_{1-2}$ (e.g., IP addresses).

Client system 105 is included to be representative of a general purpose computing system such as desktop computer and laptop computer systems, as well as representative of mobile computing devices such as tablets and smart phones configured with service console applications or web browser software.

Private network segments 120, 130 are included to be representative of computing systems and services deployed on an enterprise network or data center, as well virtual systems and services provisioned on provider clouds (e.g., a collection of virtual machine instances and related cloud services). For example, private network 130 could be provisioned on a region or availably zone offered by the provider cloud and private network 120 could be systems in an enterprise data center. Note, a cloud computing region generally corresponds to a region defined by a service provider in offering cloud based services to clients (e.g., services used to provision and virtual machines or distributed applications). While cloud computing regions may be drawn along arbitrary boundaries, cloud computing regions often correspond to geographic, national, or fault tolerance boundaries, where computing resources in one region are deployed and managed in a manner that is generally isolated from other regions. For example, a cloud computing region could correspond to a data center (or data centers) located in a particular geographic area. Data centers in different regions may help provide fault-tolerant services, e.g., should a data center in one region become inaccessible, other data centers in that region (or other regions) may continue to operate with little or no interruption to the services hosted in such regions. Further, the cloud provider may enable multiple physical or logical zones within a given cloud computing region. For example, a single data center used to provide a cloud computing region may offer multiple, fault tolerant availability zones, where a service disruption in one availability zone does not impact other availability zones within the same cloud computing region (or other regions) and the availability zones within a region may provide inexpensive, low-latency network connectivity to other availability zones within the same region. In context of this disclosure, e.g., the VPN service 111 could be provisioned on a cloud computing region with endpoints $112_{1-2}$ offered in different availability zones.

In this example, a site-to-site VPN tunnel 129 connects private networks 120, 130 over public network 150, with VPN gateway 121 and VPN service endpoint $112_2$ as tunnel endpoints. The tunnel 129 generally allows applications 123 on computing systems 125 to communicate with computing systems 115 and applications 113 as though they were hosts on a common local network. Similarly, VPN tunnel 127 connects client system 105 to private network 130, with VPN client 109 and VPN service endpoint $112_1$ as tunnel endpoints. Tunnel 127 generally allows applications 107 on client system 105 to access computing enterprise computing systems 115 and applications 123 as though they were hosts on a common local network.

Illustratively, the VPN service 111 includes a set of VPN appliances (or nodes) 110. Each VPN appliance 110 generally provides a computing system or application used to establish and maintain VPN sessions for a set of clients (e.g., VPN client 109 and VPN gateway 121). In one embodiment, as described in greater detail below, each VPN appliance 110 may push data related to each VPN session established on that VPN appliance 110 to the VPN session database 117. VPN appliances 110 may also update session information for a given VPN session when it changes, e.g., by periodically updating sequence numbers or updating cryptographic keys or security associations as this information changes. Further, each VPN appliance node 110 may attempt to retrieve VPN session data from database 117 as needed to service a given VPN session. For example, if a first one of the nodes 110 fails and VPN client 109 (or VPN gateway 121) had established a session with the failed node, the VPN client 109 could start sending traffic for that session to a second node 110. When the second node 110 first receives incoming traffic for that VPN session, the second node 110 may query VPN session database 117 to retrieve session data needed to continue the VPN session on the second node 110.

In one embodiment, the VPN session database 117 provides an eventually consistent data store, where the information for a given VPN session is not guaranteed to be available or consistent with the information for that session on the corresponding VPN appliance node 110. More specifically, the database 117 provides a high-availability, low latency database (e.g., a no-SQL key-value database) which informally guarantees that, if no new updates are made to an object (e.g., VPN session data), then eventually any request for that object will return the last updated value. Thus, some VPN sessions may not be able to be restored on a different VPN appliance 110. However, as VPN sessions should remain stable for enough time for the session data pushed to the database 117 to reach consistency with VPN session data on the corresponding VPN appliance 110, virtually all of the VPN sessions should typically be able to be restored on a different VPN appliance 110.

Further, in cases where a VPN appliance 110 is going to be taken out of service, the VPN service 111 can ensure that the session database 117 has consistent VPN session data for each VPN session on the VPN appliance 110 being taken out of service as well as manage how each session is migrated to another VPN appliance 110. For example, the service 110 may provide a node list to each VPN client 109 or gateway 121 with an established VPN session on the node being taken out of service. The VPN service 111 may also monitor the availability of each VPN appliance 110 and address service failures. For example, the VPN service 111 could identify what sessions were associated with a failed node 110 and notify the corresponding VPN clients to restore the session on a different node 110. Alternatively, in response to either a node being taken out of service or failing, the VPN service 111 could move an IP address assigned to a failed node to a different VPN appliance 110.

Figure 2:
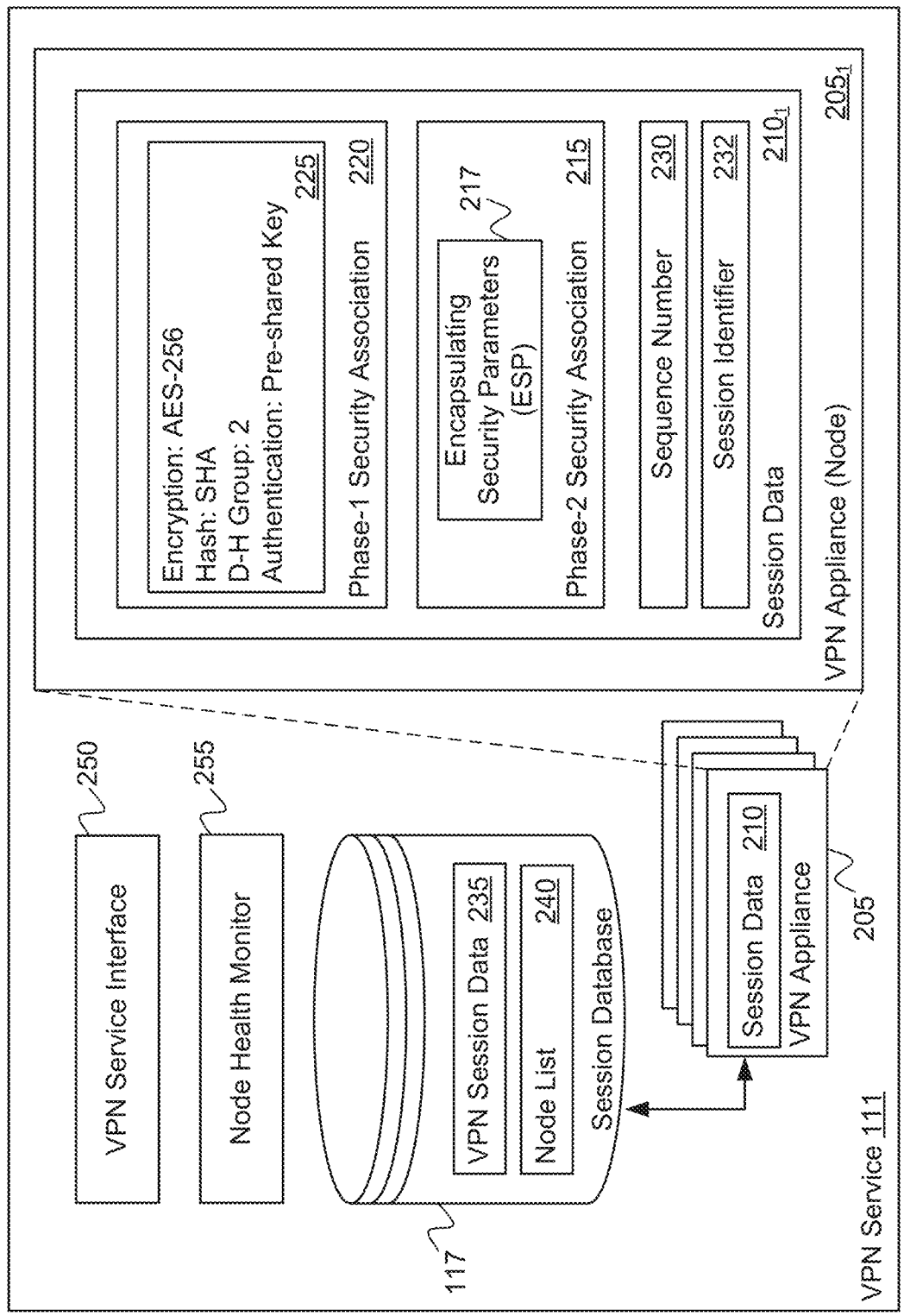
FIG. 2 further illustrates the VPN service first shown in FIG. 1, according to one embodiment.

FIG. 2 further illustrates the VPN service 111 first shown in FIG. 1, according to one embodiment. As shown, the VPN service 111 includes a set of VPN appliances 205, session database 117, node health monitor 255, and a VPN service interface 250. Each VPN appliance 205 includes session data 210 for VPN sessions established on that VPN appliance 205 (or retrieved from the session database 117).

For example, FIG. 2 shows VPN session data $210_1$ for VPN appliance $205_1$ based on the IPSec and Internet Key Exchange (IKE or IKEv2) protocols in detail. VPN session data $210_1$ includes a phase-1 security association 220, a phase-2 security association 215, and a sequence number 230. The phase-1 security association 220 includes negotiated session parameters 225.

As known, in IKE Phase-1, two VPN endpoints authenticate one another and negotiate keying material. In this example, the negotiated session parameters 225 specify the AES-256 encryption algorithm, the SHA hash algorithm, and a pre-shared key as the mechanism to authenticate VPN endpoints. The negotiated session parameters 225 are used to create encapsulating security parameters (ESP) 217 used by the phase-2 security association 215. In IKE phase-2, the two VPN endpoints use the secure tunnel created in phase-1 to negotiate ESP 217, which, in turn, is used to encrypt packets sent between the two VPN endpoints. In addition, session data $210_1$ includes a sequence number 230. As known, some tunneling protocols use sequence numbers to prevent replay attacks. In such a case, the session data $210_1$ may include a sequence number 230 used to initiate a given VPN session. Further, VPN appliance $205_1$ may update the sequence number 230 (or other session data $210_1$) pushed to the session database 117 while the corresponding VPN session remains active.

As shown, session data $210_1$ also includes a session identifier 232. The identifier 232 may generally be used by a VPN appliance 205 to identify what VPN session is associated with a given encrypted packet received from a VPN client on VPN appliance 205. In some cases, the session identifier 232 may be composed from other elements of a given VPN session—e.g., a source IP address of a VPN client and the phase-2 security association. In another embodiment, however, a VPN client could establish multiple tunnels for a common VPN session with different VPN appliances. In such cases, one session could be associated with different source or destination addresses and the session identifier 232 could be assigned by the VPN client (or Service 112 or appliance 205) to identify a VPN session across a multiple tunnels. An example of an intelligent VPN client used to manage multiple simultaneous VPN session is described below relative to FIGS. 3A-3C and FIGS. 9-11.

As stated, each VPN appliance 205 pushes session data 210 to the session database 117 (shown in FIG. 2 as VPN session data 235). And the session database 117 provides an eventually consistent data repository for the session data 235. Thus, VPN appliance $205_1$ pushes session data $210_1$ to the session database 117. If one of the VPN appliances 205 receives network traffic for a VPN session that is not recognized, that VPN appliance 205 attempts to retrieve VPN session data 235 from the session database 117 corresponding to the unrecognized VPN session. In other cases, a VPN appliance 205 may periodically cache portions of session data 235 for certain VPN sessions. For example, VPN appliance 205₁ could be designated as a failover for VPN sessions on another VPN appliance 205 and cache session data 235 for each such VPN session. In another case, VPN appliances 205₁ could fetch data for a given VPN session on second node in response to a message from the VPN service 111 indicating that the second node has failed or is scheduled to be removed from service.

As shown, session database 117 also includes a node list 240. In one embodiment, the node list 240 may identify what VPN sessions have been established on each of the VPN appliances 205, as well as what VPN appliances 205 are active and available or are in (or out) of service. The node list 240 may be maintained by the node health monitor 255. The VPN service interface 250 is included to be representative of a management or control plane for the VPN service 111. For example, the VPN service interface 250 may be used to update the node list 240, signal to the VPN service 111 to take a given VPN appliance 205 in or out of service, or otherwise configure or manage the VPN service 111.

Figure 3A:
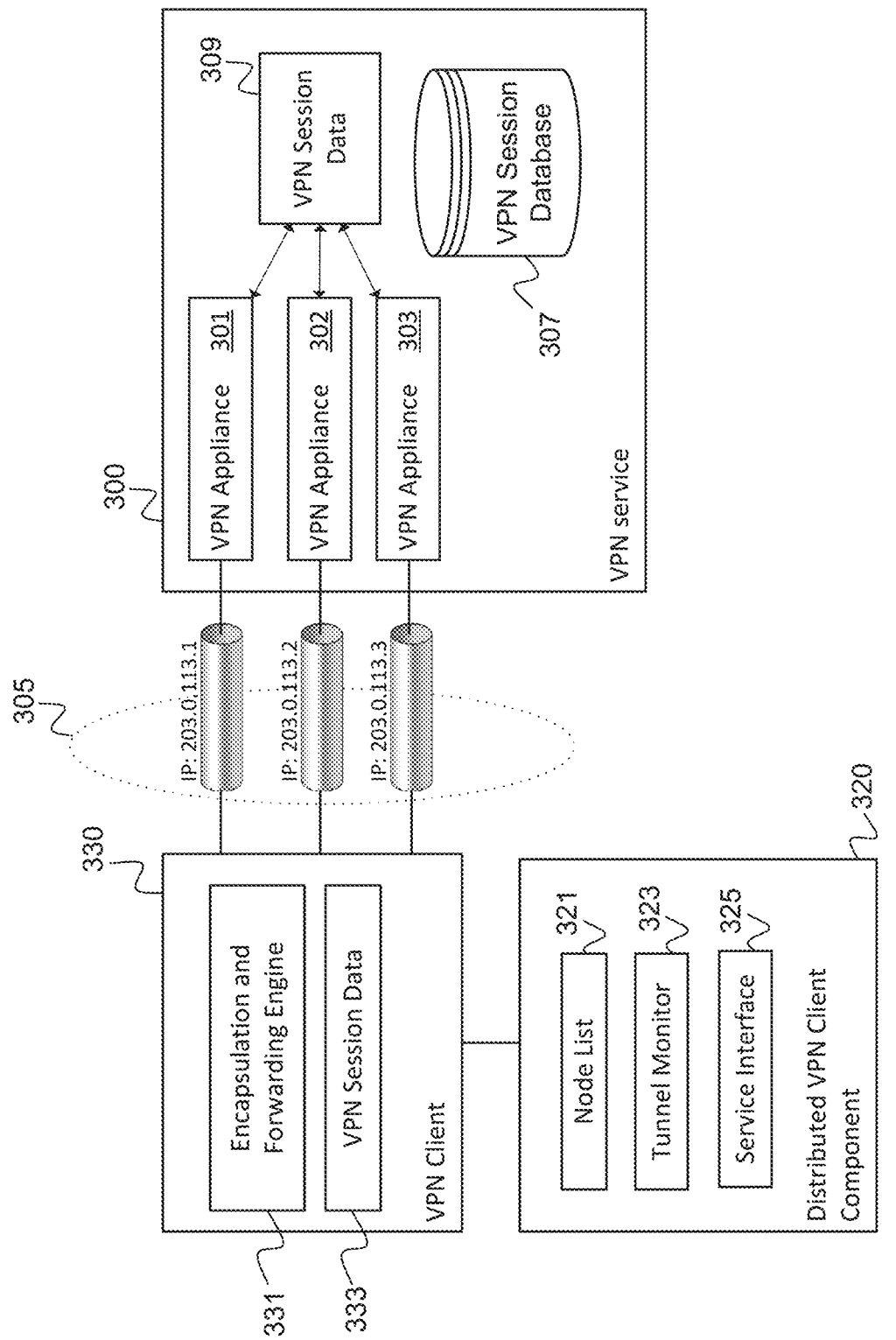
FIG. 3A illustrates a VPN client creating a multi-tunnel connection with a VPN service backed by an eventually consistent database, according to one embodiment.

FIG. 3A illustrates a VPN client 330 creating a multi-tunnel connection with a VPN service 300 backed by an eventually consistent database 307, according to one embodiment. In this example, a distributed VPN client component 320 is used to manage VPN client 330 on a local client device.

As shown, the VPN client 330 includes an encapsulating and forwarding engine 331 used to encrypt/decrypt network packets sent to/from a VPN endpoint and VPN session data 333 providing negotiated parameters and state information for VPN sessions. The distributed VPN client component 320 includes a node list 321, a tunnel monitor 323 and a service interface 325. The node list 321 generally identifies what VPN appliances in the VPN service 300 are being used for an active VPN session or which are available for use in a VPN session. Once established, the tunnel monitor 323 may track a health state of each active VPN session (or VPN appliance). If an active VPN session fails, the tunnel monitor 323 monitor could identify the failed VPN session and identify an available VPN appliance from the node list 321 to use to restore the failed session. Alternatively, the VPN client could use a DNS query to learn an address for a VPN appliance to sue to restore the failed session.

Further, in one embodiment, the distributed VPN client component 320 could be used direct VPN client 330 to create multiple tunnels at once. Once created, traffic could be hashed across a set of tunnels, providing both better performance and better load sharing. In the specific example shown in FIG. 3, the VPN client 330 has established three VPN tunnels 305, each with one of the VPN appliances 301, 302, and 303. Thus, VPN client 330 can distribute network traffic over the three VPN tunnels 305. That is, VPN client 330 could send network traffic using the three VPN tunnels 305 as part of a single VPN session, where each tunnel 305 uses the same session data to manage traffic between VPN appliance 301, 302, and 303 and VPN client 330. VPN appliance 301, 302, 303 could share session data 309 pushed to and retrieved from the session database 307. Using multiple tunnels for a common VPN session may improve the throughput performance for the session as well as fault tolerance for VPN client 330, as a loss of any one VPN tunnel 305 would result in a loss of only a fraction of overall bandwidth.

Alternatively, the VPN client 330 could use the first tunnel with VPN appliance 301 as a primary tunnel and use the two tunnels 305 with VPN appliances 302 and 303 as backup sessions. In such a case, the VPN appliance 301 pushes VPN session data 309 to the session database 307 and VPN appliances 302, 303 retrieve session data session data 309 from the session database 307. For example, FIGS. 3B-3C illustrate a VPN session migrated from a first VPN appliance to second VPN appliance using VPN session data stored in an eventually consistent database, according to one embodiment.

As shown, VPN service 300 includes VPN appliance 301, VPN appliance 302, and VPN session database 307 discussed above relative to FIG. 3A. In this example, the VPN client 330 has established a tunnel 351 with VPN appliance 301. As shown at 350, the VPN appliance 301 stores session data 307 associated with the tunnel 351. Assume for this example that VPN appliance 301 is going to be taken out of service. In one embodiment, the VPN service 350 may send a message to each VPN client that has established a secure tunnel with VPN appliance 301. For example, arrow 355 shows the appliance 301 sending a message to the distributed VPN client 320 indicating that the VPN appliance 301 is going taken out of service and that the client component 320 should restore the session with a different VPN appliance. As noted, the message may indicate a new VPN appliance the client component 320 should use in restoring the VPN session. Alternatively, the client component 320 could access a local node list, send a DNS query, or query a dedicated VPN node service listing to identify a VPN appliance to use in restoring the VPN session.

FIG. 3C illustrates the distributed VPN client component 320 reconfiguring the VPN session (at 360). For example, the distributed client component 320 could change the IP address associated with the VPN session used by VPN client 330. Once reconfigured, the VPN client 320 begins sending traffic over tunnel 352 with VPN appliance 302. In one embodiment, VPN appliance may be notified by the VPN service 300 to pull session data 308 from the database 307. That is, the VPN service may notify VPN appliance 302 to prepare to receive traffic for a VPN session being migrated from VPN appliance 301. Alternatively, when VPN appliance 302 receives traffic from the VPN client 330 for an unrecognized session, the VPN appliance may query session database 307 to retrieve session data 308.

At 365, VPN appliance 302 retrieves session data for this VPN session from session data 307. Once retrieved, VPN appliance 302 configures session data 308 in order to restore the VPN session with VPN client 330 using tunnel 352.

Figure 4:
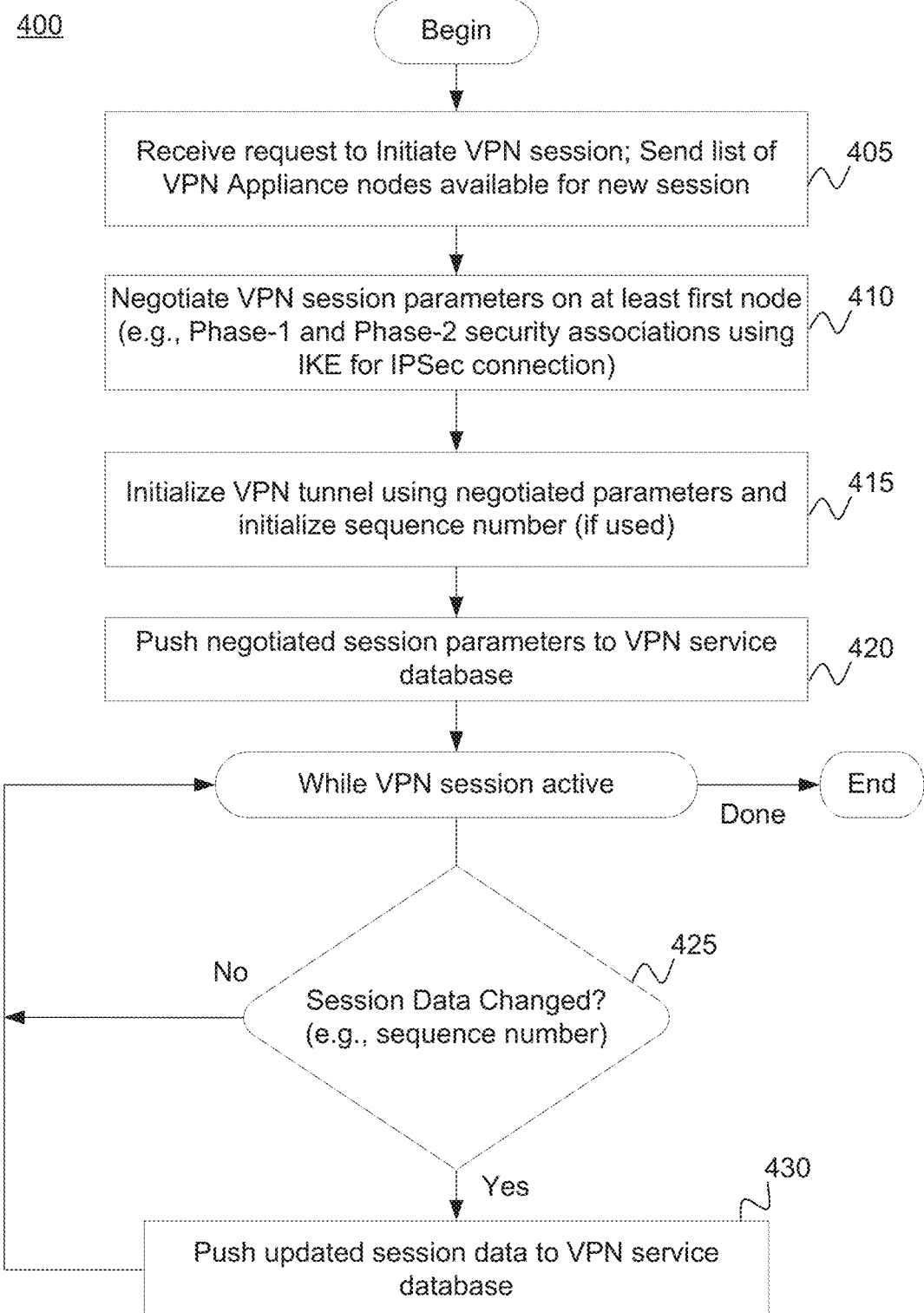
FIG. 4 illustrates method for establishing a VPN session with a VPN service backed by an eventually consistent database, according to one embodiment.

FIG. 4 illustrates method 400 for establishing a VPN session with a VPN service backed by an eventually consistent database, according to one embodiment. As shown, the method 400 begins at step 405 where a VPN service receives a request for a new connection (e.g., sent from a VPN client or VPN gateway). In response, the VPN service provides a list of VPN appliance nodes available for a new session.

At step 410, the VPN client initiates a connection to one of the VPN appliance nodes. For example, the VPN client may use the IKE protocol to create a phase-1 and phase-2 security association. Once the session parameters are negotiated, the VPN endpoints (i.e., the VPN client and appliance) initialize the VPN tunnel using the negotiated parameters. In one embodiment, if being enforced for the VPN session, a value for packet sequence numbers is initialized.

At step 420, the VPN appliance pushes the negotiated session parameters (and sequence number, if used) to the session database. Following step 420, the VPN endpoints—again the VPN client and appliance—begin sending encrypted traffic over the secure tunnel established between the endpoints. While the VPN session is active, should any of the VPN session data change (e.g., as sequence numbers are used to validate encrypted network frames), the VPN appliance updates the session database (steps 425, 3430).

Figure 5:
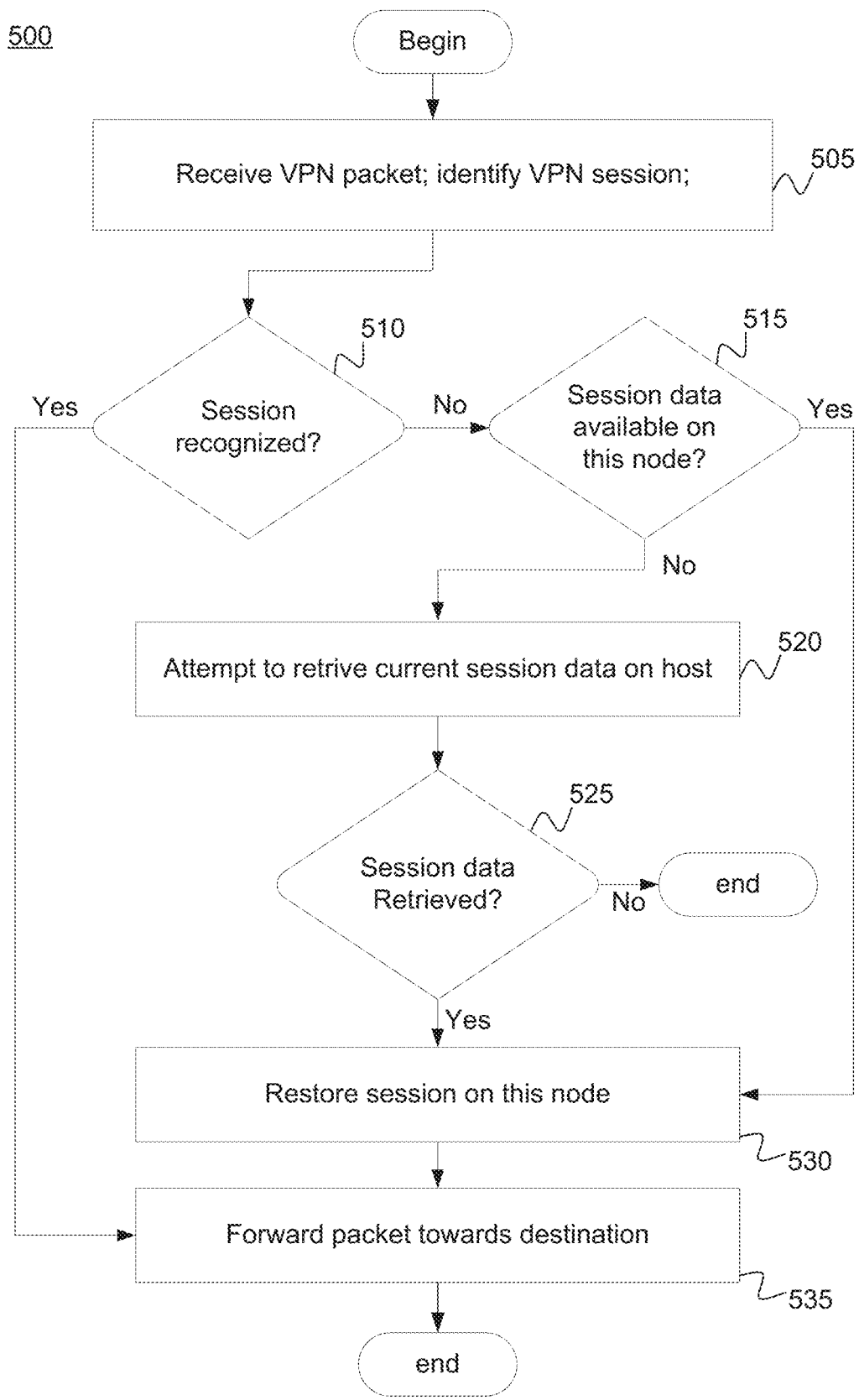
FIG. 5 illustrates a method for restoring a VPN session on a VPN appliance established using session data retrieved from an eventually consistent database, according to one embodiment.

FIG. 5 illustrates a method 500 for restoring a VPN session on a VPN appliance established using session data retrieved from an eventually consistent database, according to one embodiment. As shown, the method 500 begins at step 505 where a VPN appliance receives an encrypted network packet associated with a VPN session identified in a header of the network packet. At step 510 the VPN appliance determines whether the identified VPN session is recognized by the VPN appliance. That is, the VPN appliance determines whether it has the correct session data for the identified VPN session. At step 510, if the VPN session is recognized by the VPN appliance, then the appliance decrypts the packet and forwards it towards a destination on the private network behind the VPN appliance (step 535).

Otherwise, if the VPN session is not recognized by the VPN appliance, then the appliance attempts to restore the session. At step 515, the VPN appliance may determine whether the session data has been cached on the VPN appliance. For example, the VPN appliance may periodically pull session data from the session database for VPN sessions established on other VPN appliances. Doing so essentially prepares the VPN appliance to rapidly restore a given VPN session, if needed. Caching session data may be useful in cases where the VPN sessions do not use sequence numbers (resulting in relatively stable session data). In other cases, certain VPN sessions may be identified for caching session data on multiple appliances in order to provide high availability and very low latency session recovery (e.g., for a site-to-site VPN session with large numbers of hosts on the private network segments connected by the VPN). If the session data is cached on the local VPN appliance, then at step 530 the session is restored and the packet is decrypted and forwarded towards a destination (step 535). In one embodiment, restoring the VPN session may include any provisioning or actions performed by the VPN appliance as needed in order to send and receive encrypted network packets with the corresponding VPN client using the session data retrieved from the backend database. For example, the encapsulating security parameter associated with a phase-2 security association may be used to initialize an encryption engine.

Otherwise, if the session data is not cached, then the VPN appliance queries the backend database to retrieve the session data for the unrecognized VPN session. If the backend database does not have the session data (or such session data proves inaccurate) then the method ends. In such a case the VPN client would need to renegotiate a new VPN session with the VPN appliance. As noted above, however, while the backend database may be implemented using an eventual consistency model, in most cases the backend database should reach consistency relatively quickly as most VPN sessions should remain stable for enough time for the session data pushed to the database to reach consistency with VPN session data on the corresponding VPN appliance. Otherwise, if the session data is retrieved from the session database (step 525), the session is restored (step 530), and the packet is decrypted and forwarded towards a destination (step 535).

Figure 6:
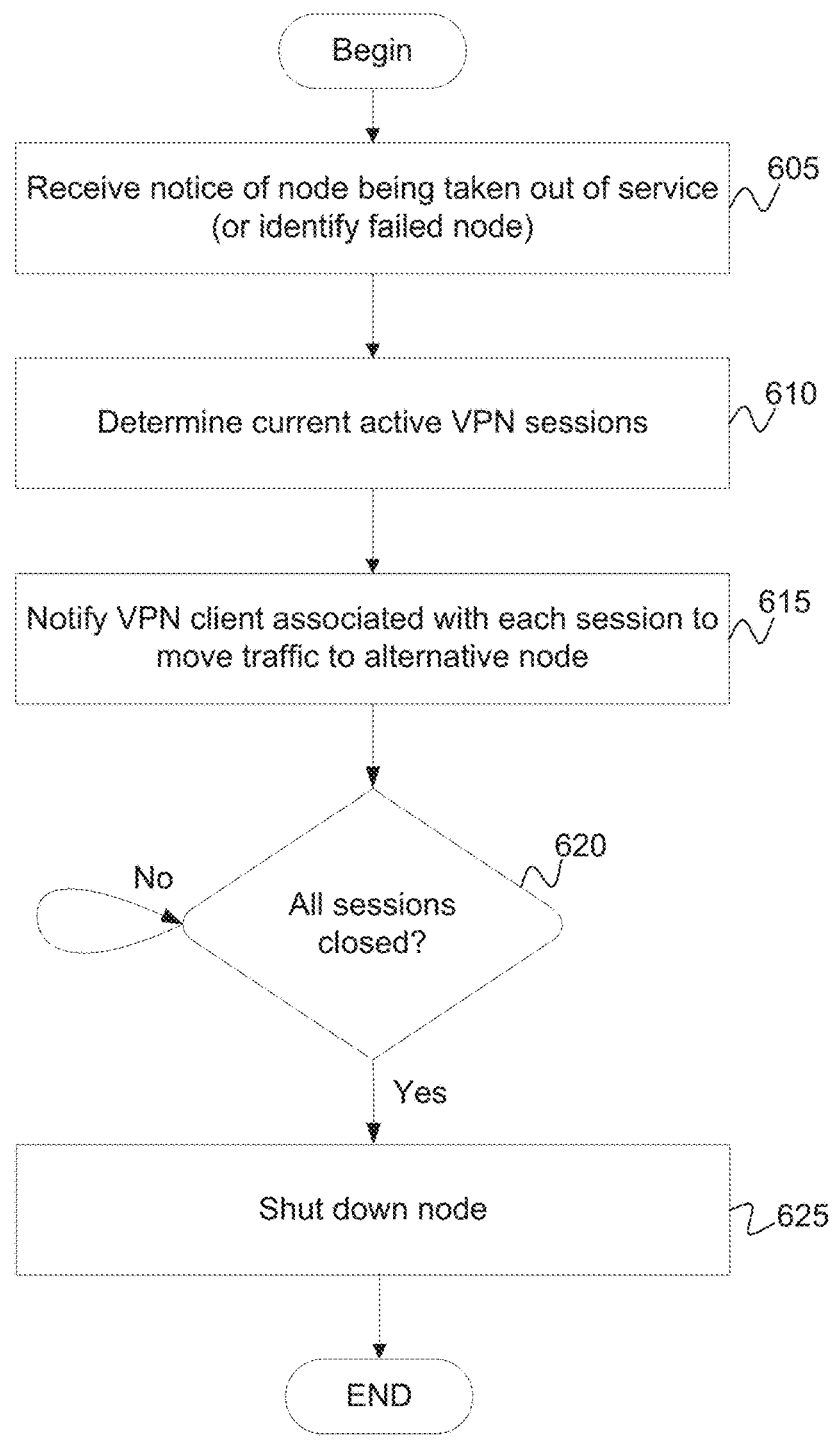
FIG. 6 illustrates a method for removing a first VPN appliance from a cluster and migrating VPN sessions on the first VPN appliance to other VPN appliances, according to one embodiment.

FIG. 6 illustrates a method 600 for removing a first VPN appliance from a cluster and migrating VPN sessions on the first VPN appliance to other VPN appliances, according to one embodiment. For example, in cases where the VPN service removes a VPN appliance out of service for maintenance reasons—then the VPN service may messages the appropriate clients that the VPN appliance is going out of service. In other cases, the VPN appliance may be taken out of service and the IP address of the appliance moved to another node. In such case, no message to individual clients is needed, as layer 3 routing advertisements will result in encrypted network traffic being routed to a new VPN appliances without the need to notify the VPN client directly.

As shown, the method 600 begins at step 605, where a VPN service receives a request to remove a VPN appliance from service (e.g., for maintenance or updates). Alternatively, the VPN service may determine that a VPN appliance has failed or become unreachable. At step 610, in cases where a VPN appliance receives a notification that it is being taken out of service, that particular VPN appliance may identify a set of active VPN sessions active on that node. At step 615, the VPN appliance notifies each such VPN client to move traffic to an alternative node. Alternatively, the VPN appliance could migrate the session to another VPN Appliance—or notify another VPN appliance to retrieve session data for a session from the backend database. At step 620, the VPN service monitors for the connections on the VPN appliance being taken out of service to close. That is, the VPN service waits for each VPN session on the VPN appliance being taken out of service to move to another VPN appliance. At step 625, the VPN service shuts down the VPN appliance being taken out service or removes the appliance as a candidate for new VPN sessions (e.g., as reflected in node lists used by VPN clients or a load balancing DNS service).

In an alternative embodiment, rather than wait for clients (or the VPN appliance) to actively migrate a session away from a VPN appliance being taken out service (or after identifying a failed or unreachable VPN appliance), the VPN service may reassign the IP address associated with the VPN appliance being removed from service to another node in the cluster. For example, VPN appliance nodes may support dynamic IP address assignment (i.e., elastic IP addressing). In such a case, the VPN appliance to which the IP address is reassigned begins servicing VPN sessions for clients using that IP address as the VPN endpoint. Further, the VPN appliance taking over may be able to cache session data for VPN sessions on other nodes from the cluster. In another case, the VPN appliance may pull session data from the backend database when receiving a packet with a destination address matching the IP address reassigned to that VPN appliance.

Figure 7:
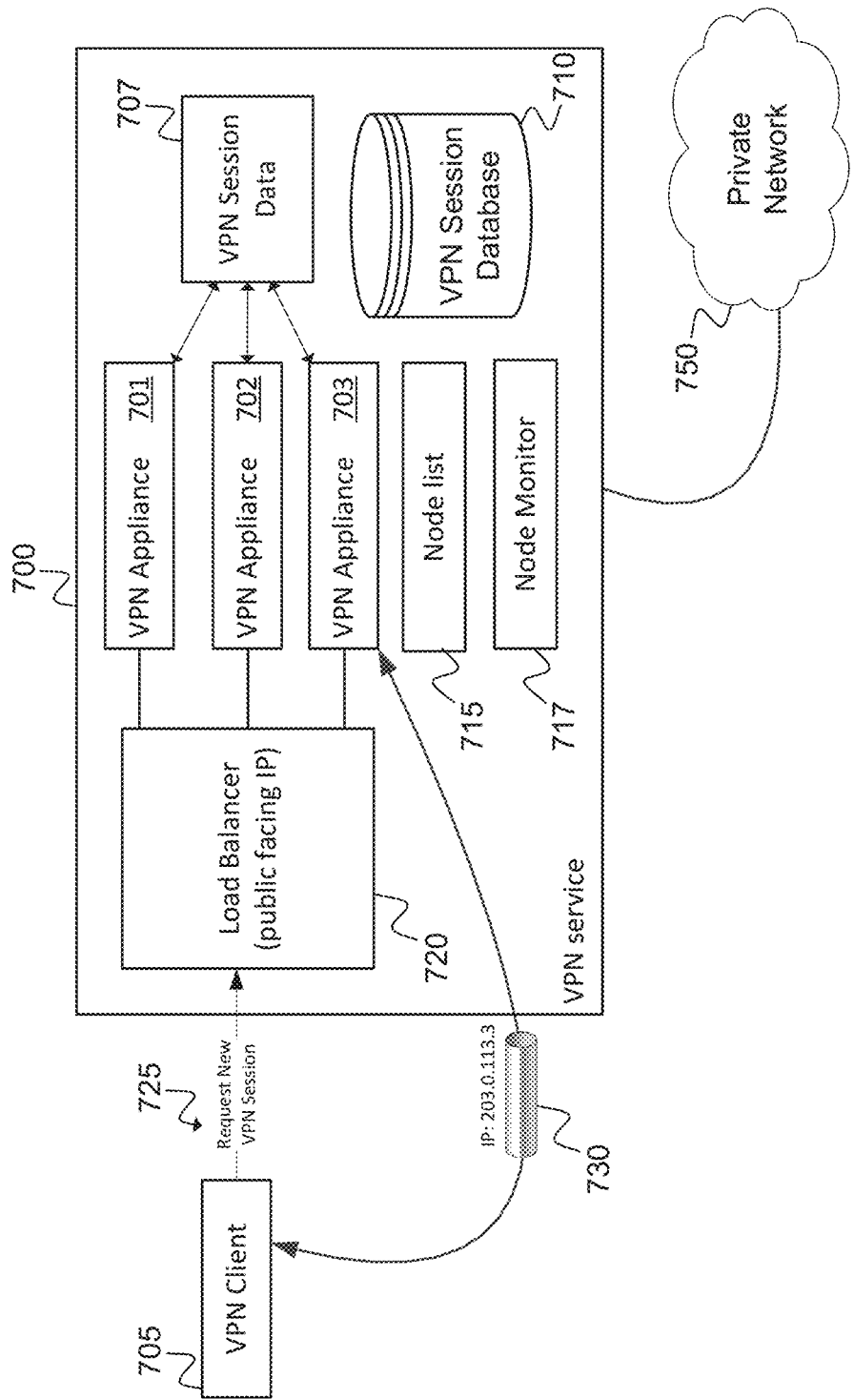
FIG. 7 illustrates a VPN service deployed behind a load balancer, according to one embodiment.

For example, FIG. 7 illustrates a VPN service 700 deployed behind a load balancer 720, according to one embodiment. As shown, a VPN service 700 includes a load balancer 720 with a public IP address. In this example, the load balancer 720 distributes requests for VPN sessions among VPN appliances 701, 702, and 703. In addition, the VPN service 700 includes a node monitor 717 used to monitor for failures in VPN appliances 701, 702, and 703 and remove failed nodes from an available VPN node list 715—preventing any new VPN sessions from being directed to a failed VPN appliance.

At 725, a VPN client 705 requests to establish a new VPN session 725. The request is directed to an IP address for the VPN service 700 and routed to the load balancer 720. Once received, the load balancer 720 selects one of the VPN appliances 701, 702, and 703 (e.g., based on the node list 715) and forwards the request to that VPN appliance. In this example, load balancer 720 forwards the request to VPN appliance 703. In turn, the VPN client 805 negotiates and establishes a secure tunnel 730 with the VPN appliance 703.

Once established, the computing system hosting VPN client 725 with hosts on private network 750.

In one embodiment, VPN appliance 703 pushes VPN session data 707 to VPN session database 710, which provides an eventually consistent repository for VPN session data. Should VPN appliance 703 fail (or be taken out of service) then the VPN session corresponding to secure tunnel 730 may be restored on either VPN appliance 701 or VPN appliance 703.

Because the VPN session database 710 generally stores session data for any active VPN session established on the VPN service 700, VPN appliances can be added or removed from active service as needed to service traffic demand. That is, in addition to creating new sessions via load balancer 720, the cluster VPN appliances used to provide the VPN service 700 may be scaled to meet ongoing demand. Further, because the VPN session data stored in an eventually consistent manner, sessions may established and updated on a given VPN appliance, without having to enforce strict consistency requirements while establishing a VPN session or changing the state of a VPN session. Similarly, VPN appliances can be rapidly added or removed from the VPN service 700.

Figure 8:
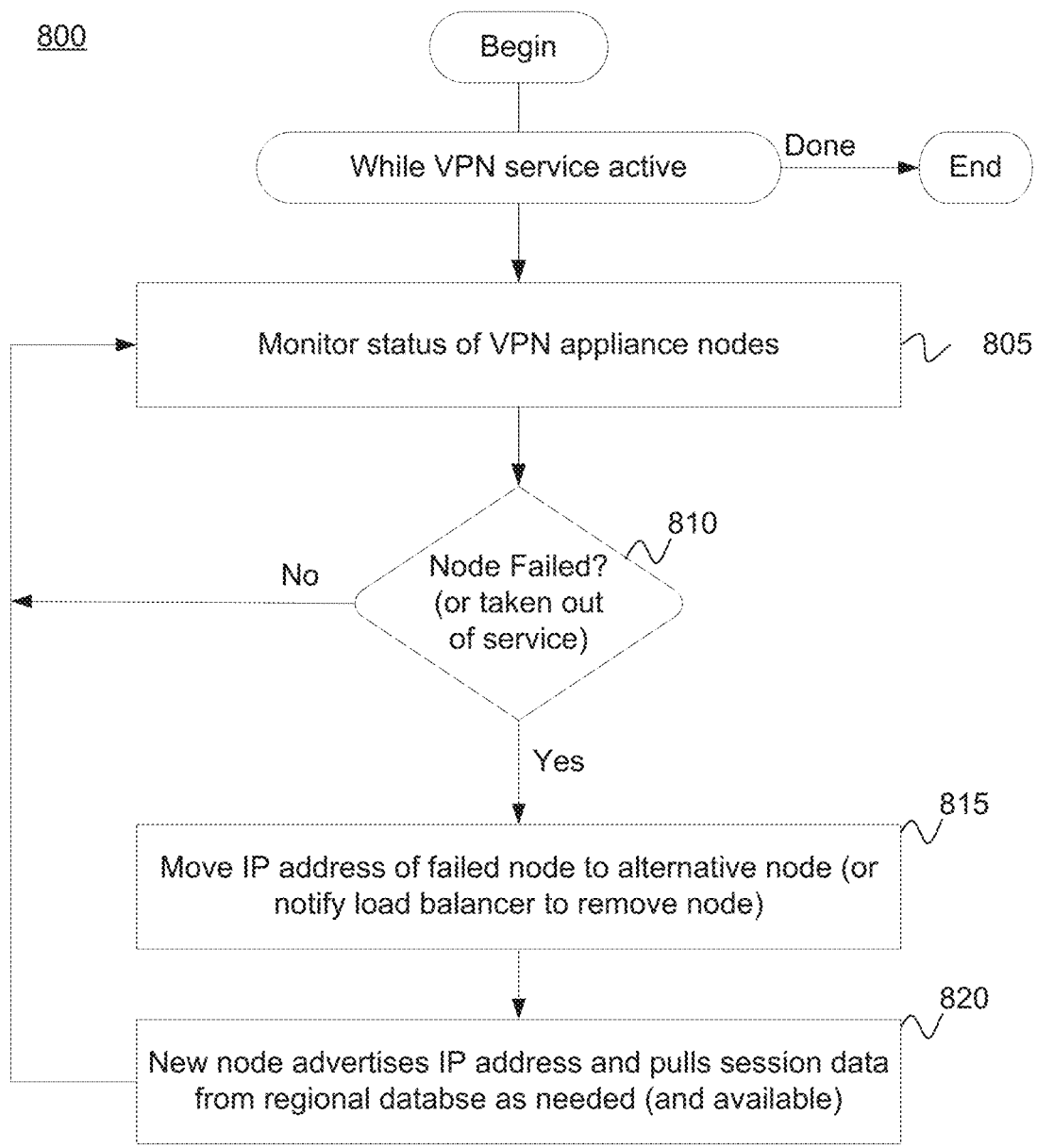
FIG. 8 illustrates a method for VPN service backed by an eventually consistent database to respond to a VPN appliance node failing, according to one embodiment.

FIG. 8 illustrates a method 800 for a VPN service backed by an eventually consistent database to respond to a failure in a VPN appliance, according to one embodiment. As shown, the method 800 begins at step 805 where a monitoring component of a VPN service monitors the health state each VPN appliance in a cluster of VPN appliances used to provide a VPN service. While the VPN service is active, the monitor generally waits until detecting that a VPN appliance has failed or become unreachable (step 810). In one embodiment, the VPN service responds at block 815 by moving the IP address used by failed (or unreachable) VPN appliance to another node. The VPN service may also notify a load balancer to remove the failed node from an active node list used by the load balancer to distribute new VPN session requests.

In cases where the VPN service reassigns an IP address to a healthy VPN appliance, at block 820 that VPN appliance advertises the IP address for routing purposes and retrieves session data for VPN sessions present on the failed node from the backend database. As noted, in some cases, the VPN appliances may periodically retrieve and cache session data for VPN sessions on other nodes of the cluster from the backend database. Alternatively, VPN appliances may retrieve session data from the backend database after receiving an encrypted packet related to an unrecognized VPN session.

If the IP address is not actively reassigned to an alternative node, the VPN clients with a VPN endpoint on the failed node may request an address for an alternative VPN appliance or obtain one from a local list of available VPN appliances. Once a new VPN appliance is identified, the VPN client begins sending traffic to that VPN appliance. In turn, that VPN appliance attempts to restore the session using cached session data or by retrieving information from the session database, as described above.

Figure 9:
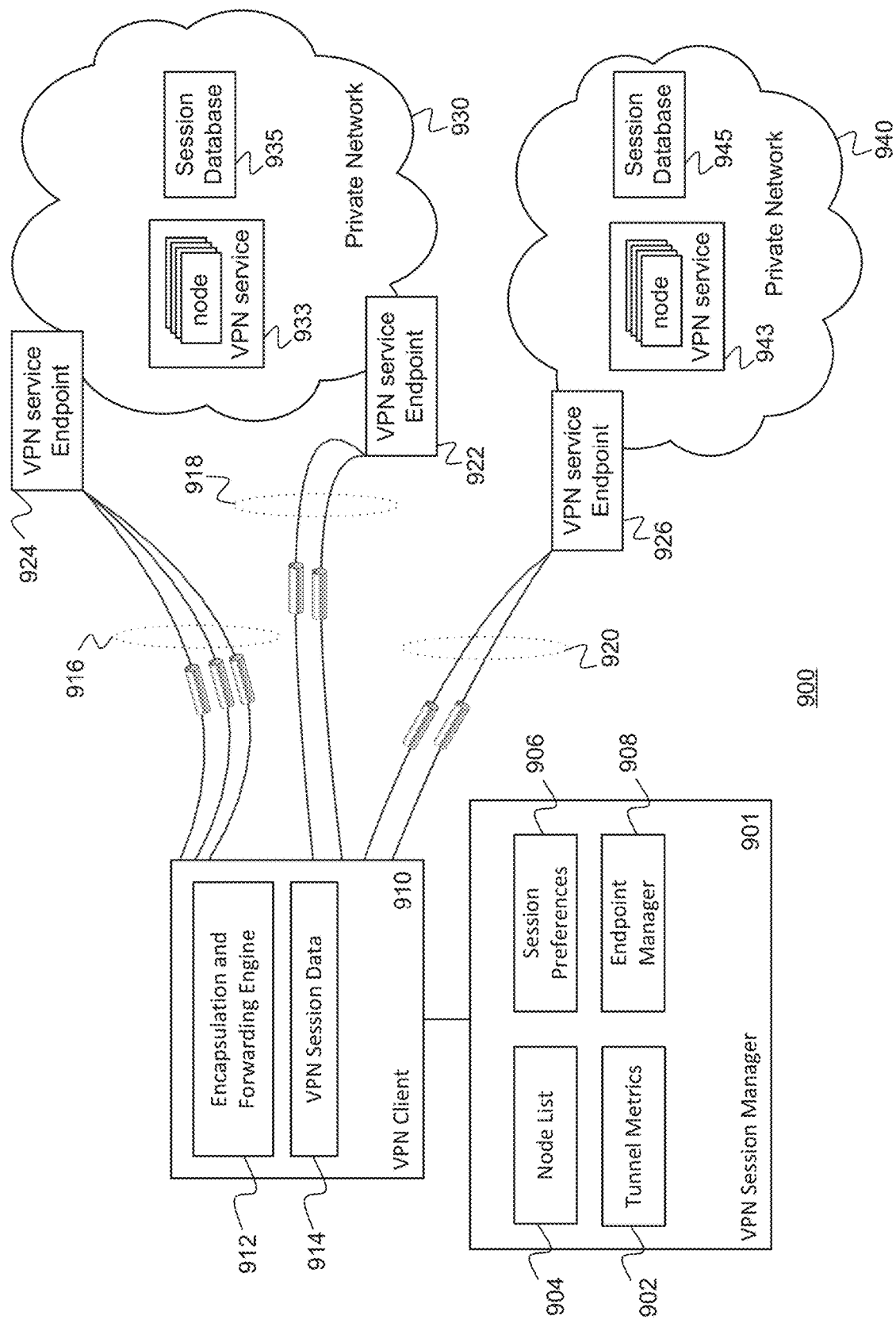
FIG. 9 illustrates a computing environment 900 with an intelligent VPN client configured to manage multiple VPN sessions established with a distributed VPN service, according to one embodiment.

FIG. 9 illustrates a computing environment 900 with an intelligent VPN client configured to manage multiple VPN sessions established with a distributed VPN service, according to one embodiment.

As shown, the VPN client 910 includes an encapsulating and forwarding engine 912 used to encrypt/decrypt network packets sent to/from a VPN endpoint and VPN session data 914. The VPN session data 914 generally includes the negotiated parameters, addresses, keys, and any related state information for a VPN session with VPN endpoints 922, 924, 926. A first private network 930 includes VPN service 933 and a second private network 940 includes VPN service 943. VPN service 933, 943 pushes session data to a local session database 935, 945, respectively. In one embodiment, the session database 935, 945 stores session data for VPN sessions according to an eventual consistency data model. Thus, VPN session data for a VPN session on a node of VPN service 933 (in private network 930) is eventually consistent with session database 935, as well as with session database 945 (in private network 940). As a result, any node in VPN service 933 (in private network 930) can service a VPN session established with node in VPN service 943 (in private network 940), provided the time required for the session database 945 to reach consistency has passed.

As shown in FIG. 9, the VPN service 933 includes VPN service endpoints 922, 924, such as a public facing IP address of a load balancer or one of the VPN appliance nodes in VPN service 933. For example, the VPN service endpoints 922, 924 could be used to expose VPN service 933 in different logical availability zones (or different physical endpoint locations) within private network 930. Similarly, VPN service 943 provides a VPN service endpoint 926 from a second private network—such as a private network in a different geographic region from private network 930. Thus, because the session database 933, 943 uses an eventually consistent data model, VPN service 933, 943 can provide a distributed VPN service where a VPN session may be serviced from different logical and physical availability zones, computing regions, data centers, etc.

Further, in one embodiment, the VPN session manager 901 may be configured to use a variety of techniques to manage multiple VPN tunnels established between VPN client 910 and a distributed VPN service 933, 943. For example, VPN client 910 could determine a set of nodes on which to establish a tunnel with the distributed VPN service 933, 943, both when initially establishing a new VPN session and dynamically in response to performance metrics, node availability, or any other suitable session preferences or needs. Once established, the VPN session manager 901 could also manage how multiple tunnels are used by the VPN client 910 for a given VPN session. For example, the VPN client 910 could load balance individual VPN network packets for a common VPN session across multiple VPN tunnels. Doing so could both improve availability and throughput for that VPN session. In other cases, the VPN client 210 could select a tunnel to use based on performance characteristics or prevailing network conditions. In still another case, the VPN client 910 could replicate a session to different endpoints. Doing so, could be used, e.g., to replicate VPN traffic to different data storage networks or database systems.

As noted above, in one embodiment, the VPN session manager 901 may be integrated as part of the VPN client 910. Alternatively, however the VPN session manager 901 may be implemented as a shim or wrapper between the VPN client 910 and distributed VPN service 933, 943. Illustratively, VPN session manager 901 includes tunnel metrics 902, node list 904, session preferences 906, and endpoint manager 908. In one embodiment, the node list 904 identifies a set of VPN appliances (nodes) available at VPN service 933 and/or VPN service 943. For example, the endpoint manager 908 may query the VPN service 933, 943 to identify what nodes are available for session tunnels between VPN client 910 and private network 930, 940. Further, the node list 904 may identify performance metrics or other characteristics about the nodes. After obtaining node list 904, the endpoint manager 908 may determine a set of tunnels to establish for a VPN session based on the node list 904, any characteristics about the available nodes, and session preferences 906. For example, the session preferences 906 may specify how many tunnels to create, rules for engine 912 to use in forwarding VPN session traffic across the different tunnels, whether to use a given tunnel as a primary or secondary tunnel, whether to replicate any VPN traffic across multiple tunnels, thresholds for performance metrics, etc.

In one embodiment, the VPN session manager 901 may collect tunnel metrics 902 for tunnels established as part of a given VPN session. The metrics could reflect, e.g., network latency, packet loss rates, etc., for each tunnel established as part of a VPN session. Doing so allows the endpoint manager 908 to optimize how tunnels 916, 918, and 920 are used to send traffic to the VPN session endpoints 922, 924, 926. For example, the endpoint manager 908 could periodically measure the latency of VPN tunnels and select the tunnel with the lowest latency or least amount of dropped packets and use that tunnel for the VPN session—moving the VPN session from one tunnel to another based on the prevailing performance characteristics.

As shown in FIG. 9, VPN client 910 has established multiple secure tunnels 916, 918, and 920 with a distributed VPN service 933 on private network 930 and with VPN service 943 on private network 940 as part of a common VPN session. Session data for each tunnel established with VPN endpoints 922, 924, and 926 is pushed to session database 935, 945 and eventually reaches a consistent state with the session data on the corresponding VPN appliance nodes. In this particular example, the VPN client 910 has established a group of three tunnels 916 with VPN appliances (nodes) in VPN service 933 via VPN service endpoint 924 and a group of two tunnels 918 with VPN appliances in VPN service 933 via VPN service endpoint 926. Additionally, VPN client 910 has established a group of two tunnels 920 with VPN appliances (nodes) in VPN service 943 via VPN service endpoint 926.

Once established, the endpoint manager 908 may direct how the tunnels 916, 918, and 920, are used to forward traffic for a common VPN session. For example, the group 916 could be used as a primary set of tunnels, whether VPN traffic is load balanced evenly across the three tunnels. In such a case, the VPN session data (pushed to session database 935) may include an identifier for a VPN session in addition to the source IP addresses used by the VPN client to establish the tunnels for the common session. Further, the tunnels 920 could be used to improve the availability of the VPN session, e.g., should one of the tunnels 916 become unavailable or unreachable. That is, in the event one of the tunnels 916 fails, the VPN session manager 901 could add one of the tunnels in group 918 as part of the set of tunnels which is distributed network traffic using a load balancing algorithm as well as establish a new tunnel between VPN client 910 and VPN service endpoint 924 (i.e., add a tunnel to the set of tunnels 916). As another example, tunnels 920 (connecting the VPN session with VPN service endpoint 926 in private network 940) could be used to replicate VPN traffic for the VPN session.

Further, the VPN session manager 901 could be used to "rebalance" or adjust what tunnels are available for a given VPN session, once established. For example, should any of the tunnels in group, 916, 918, or 920 fail or if the particular VPN appliance corresponding to one of the tunnels is taken out of service, then the endpoint manager 908 may provision additional tunnels for the session with different VPN appliances (e.g., by updating the node list 904 and establishing a tunnel with a new node).

Similarly, the VPN session manager 901 could increase the number of tunnels 916 used to direct traffic to the private network 930 in the event the tunnels 916 become saturated or should performance using the three tunnels 816 fall below thresholds specified in session preferences 906. Of course, the VPN client 910 and VPN session manager 901 could use a variety of other approaches, rules, or conditions, etc., for selecting and managing what tunnels are established, how such tunnels are used to forward VPN traffic during a VPN session, and how and when tunnels are added or removed from the set of tunnels used by a given VPN session.

The VPN session manager 901 could also increase the number of tunnels 916 used to direct traffic to the private network 930 in the event the tunnels 916 become saturated or should performance using the three tunnels 816 fall below thresholds specified in session preferences 906. Of course, the VPN client 910 and VPN session manager 901 could use a variety of other approaches, rules, or conditions, etc., for selecting and managing what tunnels are established, how such tunnels are used to forward VPN traffic during a VPN session, and how and when tunnels are added or removed from the set of tunnels used by a given VPN session.

Figure 10:
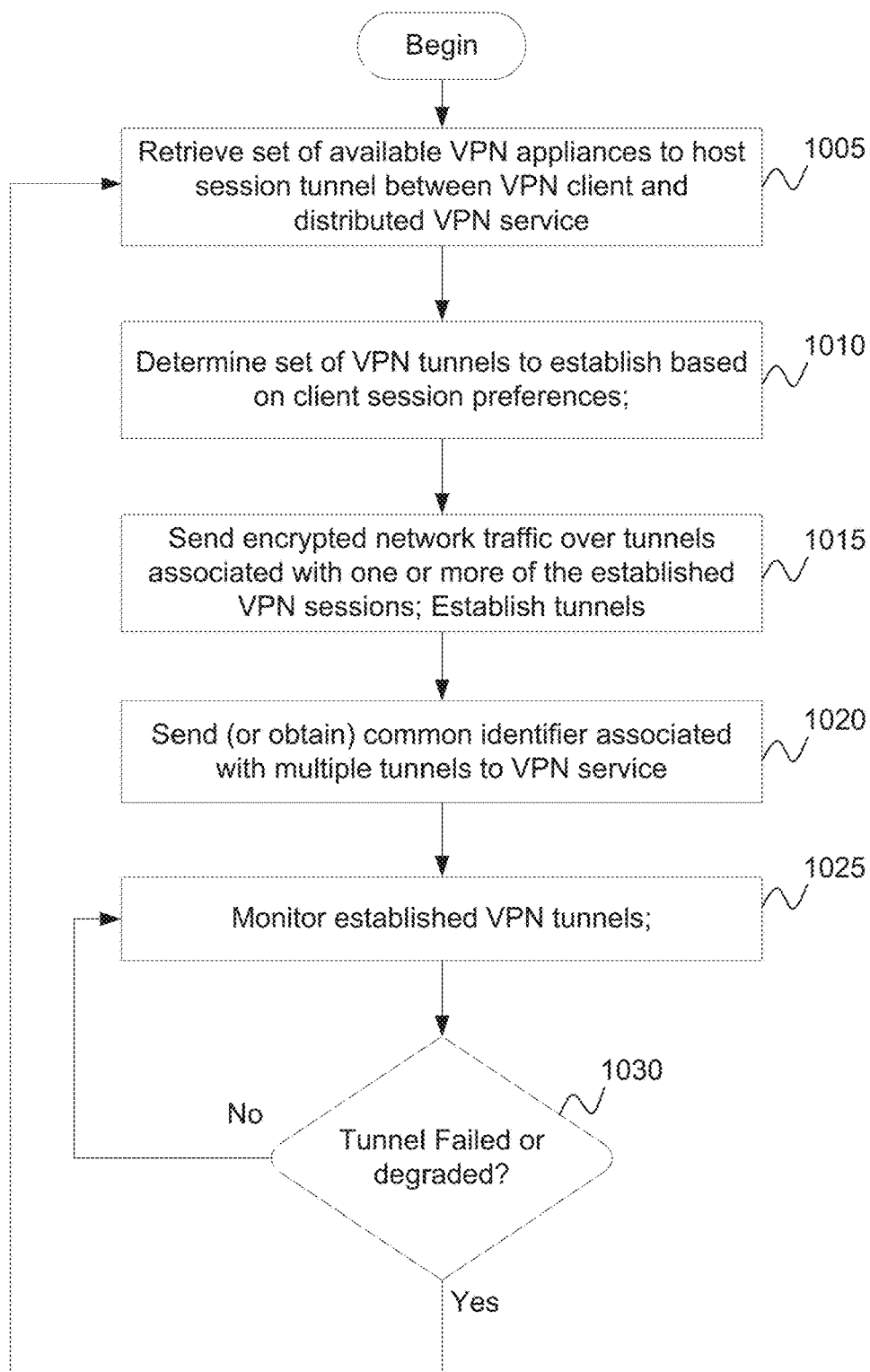
FIG. 10 illustrates a method for a VPN client to establish multiple secure tunnels as part of a VPN session, according to one embodiment.

FIG. 10 illustrates a method 1000 for a VPN client to establish multiple secure tunnels as part of a VPN session, according to one embodiment. As shown, the method 1000 begins at step 1005 where a VPN client retrieves a set of available VPN appliances to use as part of a VPN session between the VPN client and a distributed VPN service. That is, the VPN client identifies a set of VPN appliance endpoints available to use for a secure tunnel.

At step 1010, the VPN client selects a set of tunnels to establish using one or more of the VPN appliances identified at step 1010. As noted, each tunnel may be used to forward traffic for a common VPN session between the VPN client and distributed VPN service. Accordingly, in one embodiment, the VPN client may negotiate and establish a phase-1 and phase-2 security association (i.e., session data) with one of the available VPN appliance endpoints. In one endowment, the VPN client sends (or receives) an identifier used by the distributed VPN service to identify multiple tunnels as being associated with a common VPN session managed by the VPN client. As described above, e.g., the VPN client may load balance traffic across multiple tunnels—in such a case, the source IP address for each tunnel may be insufficient to identify a given tunnel as being a member of a multi-tunnel session. Accordingly, a separate identifier may be used to associate each such tunnel with the VPN session. Such an identifier may be generated either by either the VPN client or the service.

Once a VPN session is established between the VPN client and one of the appliances, the VPN client may provision a tunnel connecting the VPN client other VPN appliance endpoints selected at step 1010 using the negotiated session data. To do so, each VPN appliance may retrieve session data from the eventually the consistent database (after waiting for a required consistency period).

Once established, the VPN client sends encrypted network traffic over one or more of the tunnels associated with the VPN session (step 1020). At step 1025, the VPN client may monitor the established VPN tunnels. At step 1030, should one of the tunnels fail or otherwise become unreachable (or should performance metrics fall below specified metrics), then the method 1000 returns to step 1005, where the VPN client updates the available node list and determines whether to establish (or remove) any VPN tunnels for the VPN session. That is, if a tunnel fails or degrades, the VPN client may "rebalance" or adjust the set of tunnels used for the VPN session.

Figure 11:
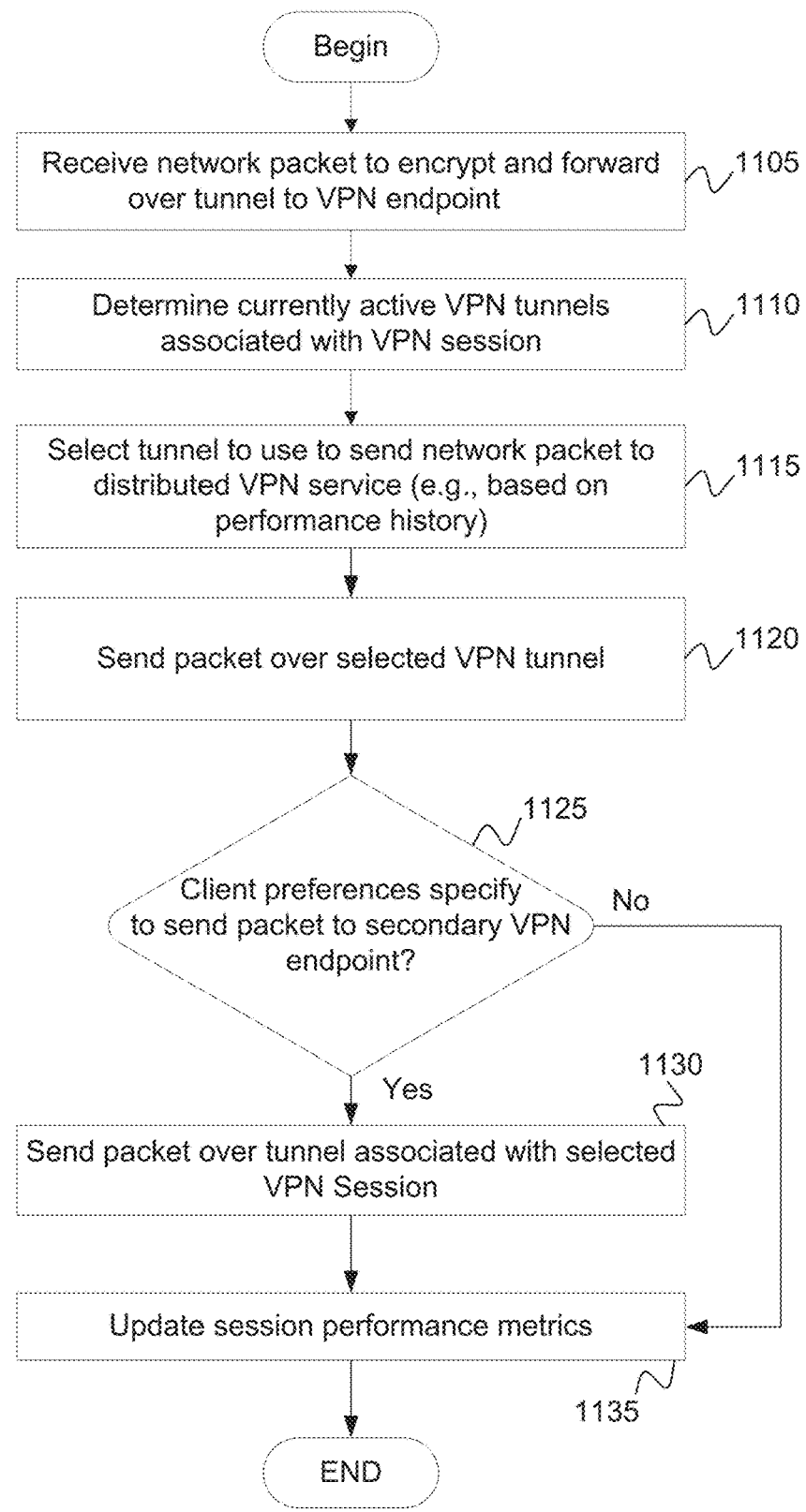
FIG. 11 illustrates a method for a VPN client to forward VPN traffic over multiple VPN tunnels established for a VPN session, according to one embodiment.

FIG. 11 illustrates a method 1100 for a VPN client to forward VPN traffic over multiple VPN tunnels established for a VPN session, according to one embodiment. As shown, the method 1100 begins at step 1105, where a VPN client receives a network packet to encrypt and forward to a VPN endpoint as part of a VPN session. At step 1110, the VPN client determines what VPN tunnels are associated the with VPN session that may be used to send the packet to the distributed VPN service. At step 1115 the VPN client selects which tunnel to use to send the packet to the VPN service. As noted, e.g., in some cases the VPN client may use a subset of the established tunnels to load balance network traffic. In other cases, the VPN client may use performance based metrics to select a VPN tunnel. Of course, other approaches could be used as well. Once selected, the VPN client encrypts the packet (e.g., using the encapsulating security parameters (ESP)) negotiated for the VPN session and forwards the traffic to the VPN service over the selected tunnel (step 1120). Note, if the particular VPN appliance servicing the selected endpoint does not have the needed session data for the VPN session—such session data may be retrieved from the backend database using the techniques described above.

At step 1125, the VPN client determines whether to forward the packet to a secondary VPN endpoint. For example, as noted above, in some cases the VPN client may replicate a VPN session with multiple endpoints, e.g., to replicate data sent to a cloud-based storage service). If so, the VPN client forwards the traffic to the VPN service over the one or more additional VPN tunnels (step 1130). Following step 1125 or 1130, the VPN client may update any session performance metrics associated with the selected tunnel (or tunnels). For example, the VPN client may record a measure of latency between sending the packet over the selected tunnel and receiving an acknowledgement or increment a packet count for the selected tunnel. As described, such metrics may be used to both select what tunnel to use to forward a given VPN packet as well as select what tunnels to establish and use for a given VPN session.

Figure 12:
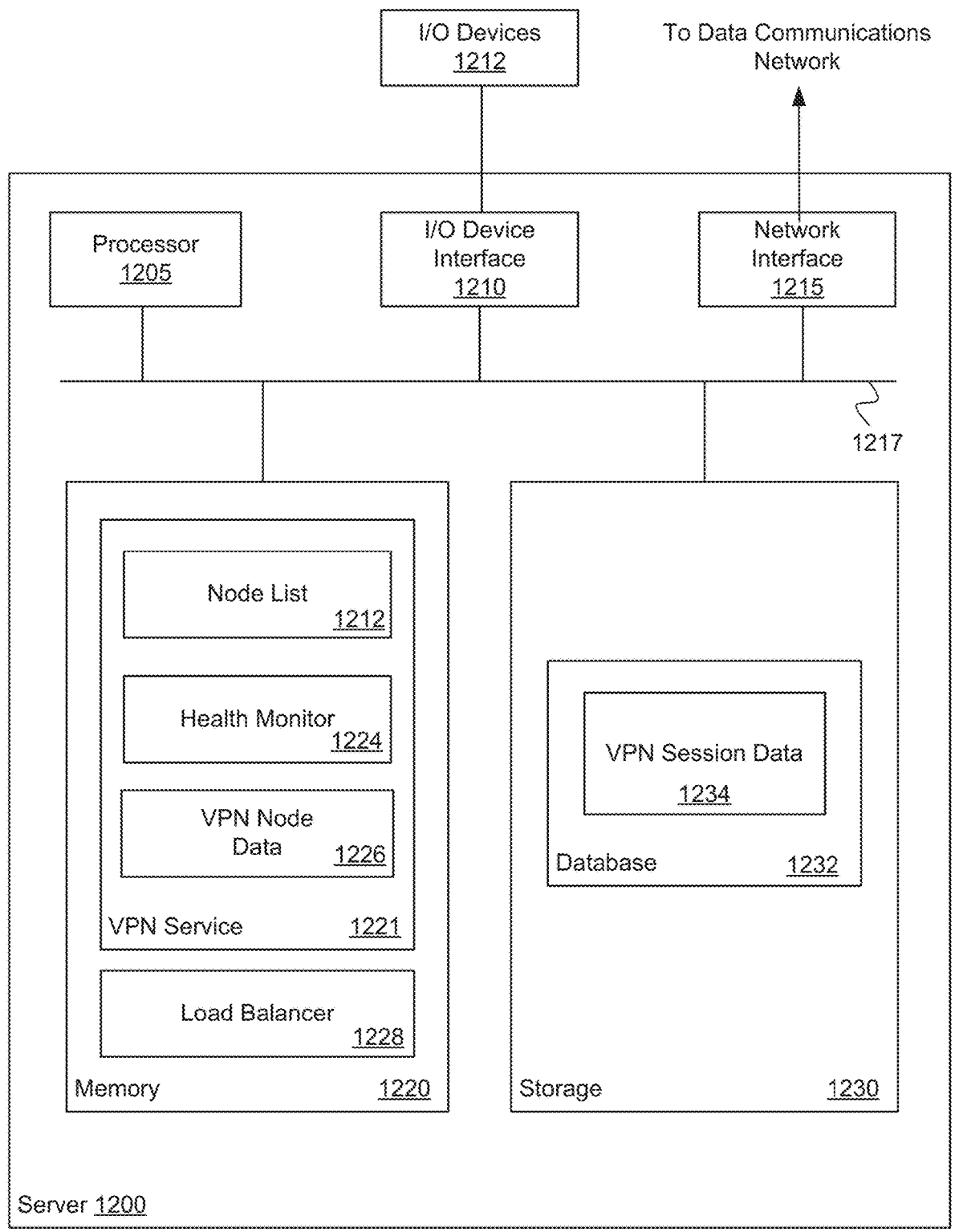
FIG. 12 illustrates an example computing system used to host a certain components of a VPN service backed by an eventually consistent database, according to one embodiment.

FIG. 12 illustrates an example computing server 1200 used to host a certain components of a VPN service backed by an eventually consistent database 1232, according to one embodiment. As shown, the computing server 1200 includes, without limitation, a central processing unit (CPU) 1205, a network interface 1215, a memory 1220, and storage 1230, each connected to a bus 1217. The computing system 1200 may also include an I/O device interface 1210 connecting I/O devices 1212 (e.g., keyboard, display and mouse devices) to the computing system 1200. Further, in context of this disclosure, the computing elements shown in computing system 1200 may correspond to a physical computing system (e.g., a system in a data center) or may be a virtual computing instance executing within a computing cloud.

The CPU 1205 retrieves and executes programming instructions stored in the memory 1220 as well as stored in the storage 1230. The interconnect 1217 is used to transmit programming instructions and application data between the CPU 1205, I/O devices interface 1210, storage 1230, network interface 1215, and memory 1220. Note, CPU 1205 is included to be representative of a single CPU, multiple CPUs, a single CPU having multiple processing cores, and the like, and the memory 1220 is generally included to be representative of a random access memory. The storage 1230 may be a disk drive or flash storage device. Although shown as a single unit, the storage 1230 may be a combination of fixed and/or removable storage devices, such as fixed disc drives, removable memory cards, optical storage, network attached storage (NAS), or a storage area-network (SAN).

Illustratively, the memory 1220 hosts a VPN service 1221, which includes the node list 1222, health monitor 1224, and VPN appliance data 1226, described above. Storage 1030 includes a database 1232 storing VPN session data 1234. As described, the VPN service 1221 may manage a collection of VPN appliances. The VPN appliances push session data for each VPN session on a given VPN appliance to the database 1232. As noted above, database 1232 may be implemented using an eventual consistency model, where VPN session data 1234 is eventually consistent with VPN session data on the corresponding VPN appliances. This approach allows most, if not all, sessions to be restored on other VPN appliances following a node failure. Further, doing so provides a VPN service that can scale both horizontally (i.e., the VPN service can support large numbers of VPN appliances) as well as geographically (i.e., nodes of the cluster do not need to be physically proximate to one another in order to satisfy latency requirements). Thus, the VPN service can provide regional endpoints to VPN clients that do not share common points of failure or administrative burdens.

Note, the above descriptions of embodiments of the present invention have been presented for purposes of illustration, but are not intended to be limited to the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present invention, other and further embodiments of the invention may be devised without departing from the basic scope thereof, and the scope thereof is determined by the claims that follow.

What is claimed is:

1. A first system, comprising:
   a processor; and
   a memory containing one or more executable programs which, when executed on the processor, perform an operation for managing virtual private network (VPN) sessions, the operation comprising:
      receiving a request to establish a first VPN session;
      negotiating a set of parameters to use for the first VPN session;
      establishing the first VPN session based on at least the negotiated set of parameters;
      exchanging encrypted network traffic with a first VPN client associated with the first VPN session;
      storing at least the negotiated set of parameters used for the first VPN session in a database in which the negotiated set of parameters is accessible by a plurality of VPN appliances, wherein the plurality of VPN appliances are of private networks of distinct geographical regions, wherein the database is external to the plurality of VPN appliances and uses an eventual consistency data model;
      in response to receiving notification to retrieve VPN session data associated with at least a second VPN session, retrieving the VPN session data from the database, wherein the second VPN session was previously established on a second system different from the first system;
      restoring the second VPN session on the first system; and
      exchanging encrypted network traffic with a second VPN client based on at least the retrieved VPN session data, wherein the second VPN client is associated with the second VPN session.

2. The first system of claim 1, wherein the negotiated set of parameters includes one or more of cryptographic parameters for a first security association, encapsulating security parameters (ESP) used for a second security association, and a packet sequence number.

3. The first system of claim 1, wherein the operation further comprises:
   updating VPN session data stored in the database for either the first VPN session or the second VPN session.

4. The first system of claim 1, wherein the request is forwarded from a load balancing service.

5. The first system of claim 1, wherein the plurality of VPN appliances are of private networks of distinct geographical regions in order to avoid a common point of failure characterized by the plurality of VPN appliances being of the same geographical region.

6. A computer-implemented method for providing a distributed virtual private network (VPN) service, the computer-implemented method comprising:
   establishing, on a first VPN appliance of a plurality of VPN appliances and by operation of a processor, a first VPN tunnel connecting the first VPN appliance and a VPN client, wherein the first VPN tunnel provides a first network tunnel for exchanging encrypted packets between the first VPN appliance and the VPN client as part of a first VPN session, wherein the plurality of VPN appliances are of private networks of distinct geographical regions; and
   sending, by the first VPN appliance, VPN session data corresponding to the first VPN session to a database, wherein the database provides the plurality of VPN appliances with access to the VPN session data using an eventual consistency data model, wherein the database is separate from the plurality of VPN appliances, wherein the VPN session data is usable to restore the first VPN session on a second VPN appliance using a second VPN tunnel;
   wherein the VPN session data includes one or more of (i) cryptographic parameters for a first security association, (ii) encapsulating security parameters (ESP) used for a second security association, (iii) network port data, (iv) packet sequence data, or (v) a session identifier associated with multiple source Internet Protocol (IP) addresses used by the VPN client.

7. The computer-implemented method of claim 6, wherein a second VPN appliance of the plurality of VPN appliances is configured to retrieve the VPN session data corresponding to the first VPN session established on the first VPN appliance in order to restore the first VPN session on the second VPN appliance using the second VPN tunnel, wherein the second VPN tunnel provides a second network tunnel for exchanging encrypted packets between the second VPN appliance and the VPN client as part of the first VPN session.

8. The computer-implemented method of claim 6, further comprising:
   updating the VPN session data stored in the database.

9. The computer-implemented method of claim 6, further comprising:
   receiving, on the first VPN appliance, a message indicating the first VPN appliance is to be taken out of service; and
   closing the first VPN tunnel established on the first VPN appliance, wherein the second VPN appliance restores the first VPN session, at least in part, using the VPN session data corresponding to the first VPN session retrieved from the database.

10. The computer-implemented method of claim 6, wherein the plurality of VPN appliances are of private networks of distinct geographical regions in order to avoid a common point of failure characterized by the plurality of VPN appliances being of the same geographical region;
   wherein the database provides the plurality of VPN appliances with access to the VPN session data using the eventual consistency data model in order to avoid a latency requirement that would create the common point of failure characterized by the plurality of VPN appliances being of the same geographical region rather than being of distinct geographical regions.

11. The computer-implemented method of claim 10, wherein the latency requirement would create the common point of failure by precluding the plurality of VPN appliances from being of distinct geographical regions, wherein each of the plurality of VPN appliances is of a respective, distinct private network of a respective, distinct geographical region;
wherein the second VPN appliance is configured to retrieve the VPN session data corresponding to the first VPN session established on the first VPN appliance in order to restore the first VPN session on the second VPN appliance using the second VPN tunnel, wherein the second VPN tunnel provides a second network tunnel for exchanging encrypted packets between the second VPN appliance and the VPN client as part of the first VPN session.

12. The computer-implemented method of claim 11, wherein the VPN session data includes one or more of (i) the cryptographic parameters for the first security association, (ii) the ESP used for the second security association, (iii) the network port data, and (iv) the packet sequence data;
wherein the VPN session data further includes the session identifier associated with multiple source IP addresses used by the VPN client, wherein the VPN client establishes a plurality of network tunnels for the first VPN session on the plurality of VPN appliances, wherein each network tunnel is associated with one of the source IP addresses.

13. The computer-implemented method of claim 12, further comprising:
updating the VPN session data stored in the database;
receiving, on the first VPN appliance, a first message indicating the first VPN appliance is to be taken out of service; and
closing the first VPN tunnel established on the first VPN appliance, wherein the second VPN appliance restores the first VPN session, at least in part, using the VPN session data corresponding to the first VPN session retrieved from the database.

14. The computer-implemented method of claim 13, further comprising:
sending a second message to the VPN client to move the first VPN session established over the first VPN tunnel to the second VPN tunnel, wherein the second VPN tunnel connects the VPN client and the second VPN appliance as part of the first VPN session;
wherein the first and second VPN appliances receive requests to establish VPN sessions distributed by a load balancer.

15. The computer-implemented method of claim 14, wherein the second VPN appliance restores the first VPN session on the second VPN appliance by accessing the VPN session data pushed to the database by the first VPN appliance in response to receiving encrypted data packets associated with the first VPN session;
wherein the first VPN session established on the first VPN appliance comprises one of a site-to-site VPN session and a single client VPN session.

16. The computer-implemented method of claim 6, wherein the second VPN appliance is configured to retrieve the VPN session data corresponding to the first VPN session established on the first VPN appliance in order to restore the first VPN session on the second VPN appliance using the second VPN tunnel.

17. The computer-implemented method of claim 6, further comprising:
receiving, on the first VPN appliance, a message indicating the first VPN appliance is to be taken out of service; and
closing the first VPN tunnel established on the first VPN appliance.

18. A non-transitory computer-readable medium storing instructions executable to perform an operation for a distributed virtual private network (VPN) service to manage a set of VPN appliances, the operation comprising:
monitoring a health state of a plurality of VPN sessions, wherein each of the VPN appliances provides an endpoint for one or more of the VPN sessions established between that respective VPN appliance and a corresponding one or more VPN clients, wherein each of the VPN appliances sends VPN session data for one or more of the VPN sessions established on that respective VPN appliance to a backend database separate from the VPN appliances, wherein the VPN appliances are of private networks of distinct geographical regions, wherein the backend database provides each of the VPN appliances with access to the VPN session data sent to the backend database by the other VPN appliances using an eventual consistency data model;
determining, by operation of a processor when executing the instructions, that the health state for at least a first one of the plurality of VPN sessions indicates that a first VPN appliance of the VPN appliances associated with a first VPN session is unavailable to the corresponding VPN client; and
notifying at least one of the first VPN appliance and the corresponding VPN client to restore the first VPN session on a second VPN appliance of the VPN appliances, including at least one of (i) reassigning an Internet Protocol (IP) address associated with the first VPN appliance to the second VPN appliance or (ii) providing the corresponding VPN client with an address of at least the second VPN appliance, whereafter the first VPN session is restored on the second VPN appliance.

19. The non-transitory computer-readable medium of claim 18, wherein the VPN session data includes one or more of cryptographic parameters for a first security association, encapsulating security parameters (ESP) used for a second security association, network port data, or packet sequence data.

20. The non-transitory computer-readable medium of claim 18, wherein the VPN session data includes a session identifier associated with multiple source IP addresses used by at least one of the one or more VPN clients.

* * * * *